United States Patent
Miyagawa

(10) Patent No.: US 12,509,485 B2
(45) Date of Patent: Dec. 30, 2025

(54) METHOD FOR PRODUCING NUCLEIC ACID OLIGOMER

(71) Applicant: SUMITOMO CHEMICAL COMPANY, LIMITED, Tokyo (JP)

(72) Inventor: Takuya Miyagawa, Oita (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/848,797

(22) PCT Filed: Mar. 20, 2023

(86) PCT No.: PCT/JP2023/010891
§ 371 (c)(1),
(2) Date: Sep. 19, 2024

(87) PCT Pub. No.: WO2023/182274
PCT Pub. Date: Sep. 28, 2023

(65) Prior Publication Data
US 2025/0145655 A1    May 8, 2025

(30) Foreign Application Priority Data

Mar. 23, 2022    (JP) .................................. 2022-047341

(51) Int. Cl.
*C07H 21/02* (2006.01)
(52) U.S. Cl.
CPC .................................. *C07H 21/02* (2013.01)
(58) Field of Classification Search
None
See application file for complete search history.

(56) References Cited

U.S. PATENT DOCUMENTS

| | | | |
|---|---|---|---|
| 9,481,702 B2 * | 11/2016 | Aoki | C07H 21/00 |
| 2007/0282097 A1 | 12/2007 | Ohgi et al. | |
| 2014/0206856 A1 | 7/2014 | Aoki et al. | |
| 2021/0040525 A1 * | 2/2021 | Sakata | C12N 9/93 |

FOREIGN PATENT DOCUMENTS

| | | | | |
|---|---|---|---|---|
| WO | WO 2006/022323 A1 | 3/2006 | | |
| WO | WO-2007099896 A1 * | 9/2007 | | C07H 21/02 |
| WO | WO 2013/027843 A1 | 2/2013 | | |
| WO | WO-2021210409 A1 * | 10/2021 | | C07H 1/00 |
| WO | WO-2022009959 A1 * | 1/2022 | | C07H 1/00 |
| WO | WO-2022064908 A1 * | 3/2022 | | C07H 1/00 |

OTHER PUBLICATIONS

Aralov, A. V. et al., Russian Journal of Bioorganic Chemistry, "Protective Groups in the Chemical Synthesis of Oligoribonucleotides", 2013, vol. 39, No. 1, pp. 3-25 (Year: 2013).*
Matsuda, H. et al., Tetrahedron Letters, "Solid-phase synthesis of oligouridine boranophosphates using the H-boranophosphonate method with 20-O-(2-cyanoethoxymethyl) protection", 2021, v. 87, 153526 pp. 1-6 (Year: 2021).*
Nukaga, Y. et al., The Journal of Organic Chemistry, "Stereocontrolled Solid-Phase Synthesis of Phosphorothioate Oligoribonucleotides Using 2'-O-(2 Cyanoethoxymethyl)-nucleoside 3'-O-Oxazaphospholidine Monomers", 2012, v. 77, pp. 7913-7922 (Year: 2012).*
Enya, E. et al., Bioorganic & Medicinal Chemistry, Chemical synthesis of diastereomeric diadenosine boranophosphates (ApbA) from 20-O-(2-cyanoethoxymethyl)adenosine by the boranophosphotriester method, 2008, v. 16, pp. 9154-9160 (Year: 2008).*

* cited by examiner

*Primary Examiner* — Bahar Craigo
(74) *Attorney, Agent, or Firm* — Oblon, McClelland, Maier & Neustadt, L.L.P.

(57) ABSTRACT

The present invention provides an efficient production method for a nucleic acid oligomer, in particular, a production method for a nucleic acid oligomer which comprises contacting a particular nucleic acid oligomer with a fluoride ion in the presence of a radical reaction inhibitor.

16 Claims, No Drawings

Specification includes a Sequence Listing.

```
SEQUENCE LISTING

Sequence total quantity: 13
SEQ ID NO: 1              moltype = DNA  length = 24
FEATURE                   Location/Qualifiers
misc_feature              1..24
                          note = artificial
source                    1..24
                          mol_type = other DNA
                          organism = synthetic construct
SEQUENCE: 1
agcagagtac acacagcata tacc                                            24

SEQ ID NO: 2              moltype = DNA  length = 26
FEATURE                   Location/Qualifiers
misc_feature              1..26
                          note = artificial
source                    1..26
                          mol_type = other DNA
                          organism = synthetic construct
SEQUENCE: 2
ggtatatgct gtgtgtactc tgcttc                                          26

SEQ ID NO: 3              moltype = DNA  length = 21
FEATURE                   Location/Qualifiers
misc_feature              1..21
                          note = artificial
variation                 7
                          note = n is a, c, g, t, or u
variation                 17
                          note = n is a, c, g, t, or u
variation                 20..21
                          note = n is a, c, g, t, or u
```

```
source                   1..21
                         mol_type = other DNA
                         organism = synthetic construct
SEQUENCE: 3
atggaanact cttggtnacn n                                              21

SEQ ID NO: 4             moltype = DNA   length = 21
FEATURE                  Location/Qualifiers
misc_feature             1..21
                         note = artificial
variation                2
                         note = n is a, c, g, t, or u
variation                5..6
                         note = n is a, c, g, t, or u
variation                12
                         note = n is a, c, g, t, or u
variation                14..17
                         note = n is a, c, g, t, or u
variation                19..21
                         note = n is a, c, g, t, or u
source                   1..21
                         mol_type = other DNA
                         organism = synthetic construct
SEQUENCE: 4
gnaannaaga gnannnnann n                                              21

SEQ ID NO: 5             moltype = DNA   length = 36
FEATURE                  Location/Qualifiers
misc_feature             1..36
                         note = artificial
source                   1..36
                         mol_type = other DNA
                         organism = synthetic construct
SEQUENCE: 5
agagccagcc ttcttattgt tttagagcta tgctgt                              36

SEQ ID NO: 6             moltype = DNA   length = 23
FEATURE                  Location/Qualifiers
misc_feature             1..23
                         note = artificial
source                   1..23
                         mol_type = other DNA
                         organism = synthetic construct
SEQUENCE: 6
ccatgagaag tatgacaaca gcc                                            23

SEQ ID NO: 7             moltype = DNA   length = 25
FEATURE                  Location/Qualifiers
misc_feature             1..25
                         note = artificial
source                   1..25
                         mol_type = other DNA
                         organism = synthetic construct
SEQUENCE: 7
ggctgttgtc atacttctca tggtt                                          25

SEQ ID NO: 8             moltype = DNA   length = 67
FEATURE                  Location/Qualifiers
misc_feature             1..67
                         note = artificial
source                   1..67
                         mol_type = other DNA
                         organism = synthetic construct
SEQUENCE: 8
acagcatagc aagttaaaat aaggctagtc cgttatcaac ttgaaaaagt ggcaccgagt    60
cggtgct                                                              67

SEQ ID NO: 9             moltype = DNA   length = 94
FEATURE                  Location/Qualifiers
misc_feature             1..94
                         note = artificial
source                   1..94
                         mol_type = other DNA
                         organism = synthetic construct
SEQUENCE: 9
gttttccctt tcaaagaaa tctcctgggc acctatcttc ttaggtgccc tcccttgttt     60
aaacctgacc agttaaccgg ctggttaggt tttt                                94

SEQ ID NO: 10            moltype = DNA   length = 100
```

```
FEATURE             Location/Qualifiers
misc_feature        1..100
                    note = artificial
source              1..100
                    mol_type = other DNA
                    organism = synthetic construct
SEQUENCE: 10
agtcctcatc tccctcaagc gttttagagc tagtaatagc aagttaaaat aaggctagtc    60
cgttatcaac ttgaaaaagt ggcaccgagt cggtgctttt                          100

SEQ ID NO: 11       moltype = DNA  length = 113
FEATURE             Location/Qualifiers
misc_feature        1..113
                    note = artificial
source              1..113
                    mol_type = other DNA
                    organism = synthetic construct
SEQUENCE: 11
gcagatgtag tgtttccaca gtttaagagc tatgctggaa acagcatagc aagtttaaat    60
aaggctagtc cgttatcaac ttgaaaaagt ggcaccgagt cggtgctttt ttt           113

SEQ ID NO: 12       moltype = DNA  length = 113
FEATURE             Location/Qualifiers
misc_feature        1..113
                    note = artificial
variation           1..20
                    note = n is a, c, g, t, or u
source              1..113
                    mol_type = other DNA
                    organism = synthetic construct
SEQUENCE: 12
nnnnnnnnnn nnnnnnnnnn gtttaagagc tatgctggta acagcatagc aagtttaaat    60
aaggctagtc cgttatcaac ttgaaaaagt ggcaccgagt cggtgctttt ttt           113

SEQ ID NO: 13       moltype = DNA  length = 113
FEATURE             Location/Qualifiers
misc_feature        1..113
                    note = artificial
variation           1..3
                    note = n is a, c, g, t, or u
variation           110..112
                    note = n is a, c, g, t, or u
source              1..113
                    mol_type = other DNA
                    organism = synthetic construct
SEQUENCE: 13
nnncctcatc tccctcaagc gtttaagagc tatgctggta acagcatagc aagtttaaat    60
aaggctagtc cgttatcaac ttgaaaaagt ggcaccgagt cggtgctttn nnt           113
```

METHOD FOR PRODUCING NUCLEIC ACID OLIGOMER

CROSS-REFERENCE TO RELATED APPLICATIONS

The present application is a 35 U.S.C. § 371 national stage patent application of International patent application PCT/JP2023/010891, filed on Mar. 20, 2023, which is based on and claims the benefits of priority to Japanese Application No. 2022-047341, filed on Mar. 23, 2022. The entire contents of these applications are incorporated herein by reference.

REFERENCE TO A SEQUENCE LISTING

In accordance with 37 CFR § 1.831-1835 and 37 CFR § 1.77(b) (5), the specification makes reference to a Sequence Listing submitted electronically as an .xml file named "553579US_011725_ST26.xml". This .xml file was generated on Jan. 17, 2025 and is 22,273 bytes in size. The entire contents of the Sequence Listing are hereby incorporated by reference.

TECHNICAL FIELD

This application claims priority to and the benefit of Japanese Patent Application No. 2022-047341 filed Mar. 23, 2022 according to the Paris Convention, the entire contents of which are incorporated herein by reference.

The present invention relates to a production method for a nucleic acid oligomer containing ribose, and in more details, relates to a method for deprotecting a protecting group of a hydroxy group in a ribose contained in a nucleic acid oligomer.

BACKGROUND ART

In recent years, an attention in the application of nucleic acid oligomers to the medical field has been increased. Examples include antisense nucleic acids, aptamers, ribozymes, and nucleic acids which induce RNA interference (RNAi) such as siRNA, and the others, which are called nucleic acid therapeutics.

A nucleic acid oligomer can be synthesized by solid-phase synthesis method, and in solid-phase synthesis method, a phosphoramidite (hereinafter, referred to as an "amidite") of nucleoside is used as a raw material. A nucleic acid oligomer which is synthesized by an elongation of a nucleic acid on a solid support is cleaved from the solid support, and then in the nucleic acid oligomer containing ribose, the protecting group of the hydroxy group at the 2' position of the ribose is removed by deprotection to produce a desired nucleic acid oligomer. The purity of the nucleic acid oligomer synthesized in this manner is not necessarily satisfactory because the process is passed through multi-steps such as the elongation reaction step of nucleic acid on the solid support, the cleavage step from the solid support, and the deprotection step of each protecting group, which as a result, the synthesis is not efficient (see Patent Literatures 1 and 2).

CITATION LIST

Patent Literature

Patent Literature 1: WO 2006/022323 A1
Patent Literature 2: WO 2013/027843 A1 SUMMARY OF THE INVENTION Problems to be Solved by Invention An object of the present invention is to provide an efficient production method for a nucleic acid oligomer.

Means to Solve Problems

The present inventor has intensively studied to achieve the above object, and found out that by contacting a nucleic acid oligomer with a fluoride ion in the presence of a radical reaction inhibitor, protecting groups of hydroxy groups in ribose contained in the nucleic acid oligomer can be effectively deprotected. As a result, an efficient production method for a nucleic acid oligomer can be provided.

The present invention has been completed on the basis of these findings, and encompasses the following aspects, but are not limited thereto.

[1] A production method for a nucleic acid oligomer represented by the following formula (4):

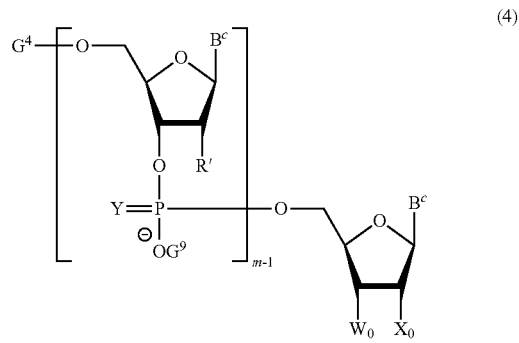

(wherein
R' is identical to or different from each other and each independently represents a hydroxy group, a hydrogen atom, a fluorine atom, a methoxy group, a 2-methoxyethyl group, or an OQ' group,
Q' is identical to or different from each other and each independently represents a methylene group which is bonded to the carbon atom at the 4' position of the ribose, an ethylene group which is bonded to the carbon atom at the 4' position of the ribose, or an ethylidene group which is bonded to the carbon atom at the 4' position of the ribose,
the definitions of substituents $G^4$, $G^9$, Y, $B^c$ and m of the formula (4) are the same as those defined in the below formula (3).
$W_0$ is a hydroxy group,
$X_2$ is the same as those defined in the above R' group.
when m is an integer of 3 or more, the nucleic acid oligomer represented by formula (4) is a nucleic acid oligomer in which a non-nucleotide linker may be incorporated instead of the p nucleotides (with the proviso that p is a positive integer satisfying the equation: m−1>p) between the respective nucleotides at the 5' terminal and the 3' terminal), which comprises contacting a nucleic acid oligomer represented by the following formula (3):

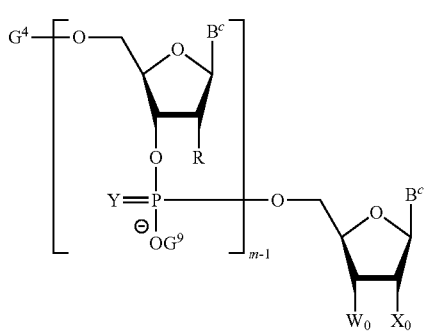

(3)

(wherein,
G⁴ represents a hydrogen atom or a protecting group of a hydroxy group,
G⁹ represents an ammonium ion, an alkylammonium ion, an alkali metal ion, a hydrogen ion or a hydroxyalkylammonium ion,
$B^c$ represents a nucleobase, each of which is independently identical to or different from each other,
R is identical to or different from each other and each independently represents a hydrogen atom, a fluorine atom or an OQ group,
Q is identical to or different from each other and each independently represents a tert-butyldimethylsilyl group, a methyl group, a 2-methoxyethyl group, a methylene group which is bonded to the carbon atom at the 4' position of the ribose, an ethylene group which is bonded to the carbon atom at the 4' position of the ribose, an ethylidene group which is bonded to the carbon atom at the 4' position of the ribose, or a protecting group represented by the following formula (1)

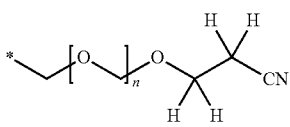

(1)

(wherein
the bond marked with * represents a bond with the oxygen atom of the OQ group, and
n represents any integer of 0 or more),
Y is identical to or different from each other and each independently represents an oxygen atom or a sulfur atom,
m represents any integer from 2 to 300,
W and X are defined as either the following (a) or (b):
(a) when W is a hydroxy group, X is the same as defined as those of the above R group,
(b) when X is a hydroxy group, W represents an OV group,
V represents a tert-butyldimethylsilyl group or the group of the above formula (1).
with proviso that at least one group of the above R, W and X represents a hydroxy group protected with the protecting group of the above formula (1), and
when m is an integer of 3 or more, the nucleic acid oligomer represented by formula (3) is a nucleic acid oligomer in which a non-nucleotide linker may be incorporated instead of the p nucleotides (with the proviso that p is a positive integer satisfying the equation: m−1>p) between the respective nucleotides at the 5' terminal and the 3' terminal)
with a fluoride ion in the presence of a radical reaction inhibitor (hereinafter, the method is referred to as the "production method of the present invention", or the "production method of the embodiment described herein").

[2] The production method according to [1] wherein n is 0 or 1.

[3] The production method according to [1] wherein n is 0. [4] The production method according to [1] wherein n is 1.

[5] The production method according to any one of [1] to [4] wherein the non-nucleotide linker is a linker comprising an amino acid backbone.

[6] The production method according to [5] wherein the linker comprising an amino acid backbone is a linker having a structure of the following formula (A14-1), (A14-2) or (A14-3).

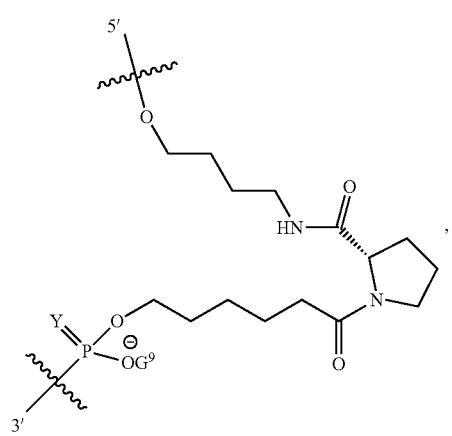

(A14-1)

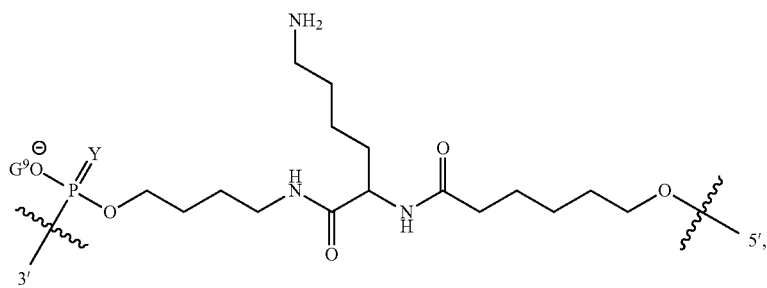

(A14-2)

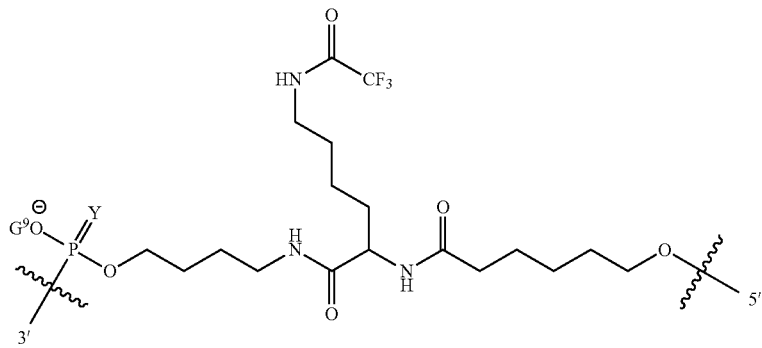

(A14-3)

(wherein 5' and 3' represents the 5' terminal side and the 3' terminal side of the nucleic acid oligomer, respectively.).

[7] The production method according to any one of [1] to [6] wherein W is a hydroxy group, X is an R group, $W_0$ is a hydroxy group, and $X_0$ is an R' group.

[8] The production method according to any one of [1] to [7] wherein the fluoride ion source is tetraalkylammonium fluoride.

[9] The production method according to any one of [1] to [8] wherein the fluoride ion source is tetra-n-butylammonium fluoride.

[10] The production method according to any one of [1] to [9] wherein the radical reaction inhibitor is an inhibitor of radical chain reaction initiation, a radical scavenger, or a peroxide decomposer.

[11] The production method according to any one of [1] to [9] wherein the radical reaction inhibitor is a radical scavenger.

[12] The production method according to [11] wherein the radical scavenger is a phenol type of antioxidant or a hindered amine type of light stabilizer.

[13] The production method according to [11] wherein the radical scavenger is a phenol type of antioxidant.

[14] The production method according to [12] or [13] wherein the phenol type of antioxidant is a compound represented by the following formula (8):

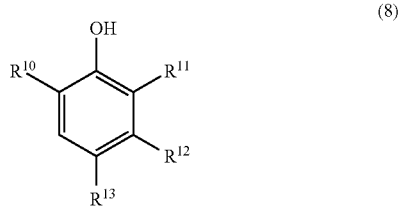

(8)

(wherein
$R^{10}$, $R^{11}$, $R^{12}$, and $R^{13}$ are each independently identical to or different from each other and represent a chain hydrocarbon group, a carbocyclyl group, a heterocyclyl group, an alkoxy group, an alkylsulfanyl group {the chain hydrocarbon group, the carbocyclyl group, the heterocyclyl group, the alkoxy group, the alkylsulfanyl group may optionally have one or more substituents}, $SiR^{51}R^{52}R^{53}$, an amide group, C(O)$R^{61}$, OC(O)$R^{61}$, a hydroxy group, or a hydrogen atom, $R^{51}$, $R^{52}$, and $R^{53}$ are each independently identical to or different from each other and represent an alkyl group, an alkoxy group, or a hydrogen atom, and $R^{61}$ represents a chain hydrocarbon group).

[15] The production method according to [12] wherein the radical scavenger is the hindered amine type of light stabilizer.

[16] The production method according to [12], [14], or [15] wherein the hindered amine type of light stabilizer is a compound represented by the following formula (12):

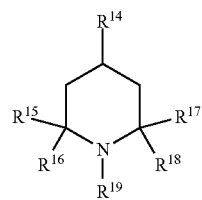

(12)

(wherein
$R^{14}$ represents OC(O)$R^{20}$, NHR$^{20}$, or a hydrogen atom, $R^{19}$ represents an alkyl group, an alkoxy group, an oxygen free radical, a hydroxy group, or a hydrogen atom, $R^{15}$, $R^{16}$, $R^{17}$, and $R^{18}$ are each independently identical to or different from each other and represent an alkyl group or a hydrogen atom, $R^{20}$ represents a chain hydrocarbon group, a carbocyclyl group, a heterocyclyl group, an alkoxy group, an alkylsulfanyl group {the chain hydrocarbon group, the carbocyclyl group, the heterocyclyl group, the alkoxy group, and the alkylsulfanyl group may optionally have one or more substituents}, $SiR^{54}R^{55}R^{56}$, an amide group, a hydroxy group, or a hydrogen atom, and $R^{54}$, $R^{55}$, and $R^{56}$ are each independently identical to or different from each other and represent an alkyl group, an alkoxy group, or a hydrogen atom).

[17] The production method according to any one of [1] to [9] wherein the radical reaction inhibitor is a peroxide decomposer.

[18] The production method according to [17] wherein the peroxide decomposer is a phosphorous type of antioxidant or a sulfur type of antioxidant.

[19] The production method according to [17] wherein the peroxide decomposer is a phosphorous type of antioxidant.

[20] The production method according to [17] wherein the peroxide decomposer is a sulfur type of antioxidant.

[21] The production method according to any one of [1] to [9] wherein the radical reaction inhibitor is a inhibitor of radical chain reaction initiation.

[22] The production method according to [21] wherein the inhibitor of radical chain reaction initiation is a metal deactivator or an ultraviolet absorber.

[23] The production method according to [21] wherein the inhibitor of radical chain reaction initiation is a metal deactivator.

[24] The production method according to [21] wherein the inhibitor of radical chain reaction initiation is an ultraviolet absorber.

[25] The production method according to any one of [1] to [24] wherein the amount of the radical reaction inhibitor used is 9 moles or less as the molar amount to 1 mole of the mole number which is calculated by multiplying a mole number of the nucleic acid oligomer represented by formula (3) by the number of the case where R represents a group represented by formula (1) in the formula (3).

[26] The production method according to any one of [1] to [25] wherein for R, W and X in the nucleic acid oligomer represented by formula (3), the ratio of the protecting group of the above formula (1) is 10% or more, and the nucleic acid chain length is 10 mer or more.

Effect of Invention

The present invention provides an efficient production method for a nucleic acid oligomer. The purity of the nucleic acid oligomer produced is expected to improve.

MODE FOR CARRYING OUT THE INVENTION

As an embodiment for implementing the present invention, embodiments will be shown and explained, but the present invention is not limited to the following embodiments.

The substituent(s) is/are explained.

The term "halogen atom" represents a fluorine atom, a chlorine atom, a bromine atom, or an iodine atom.

When a substituent has two or more halogen atoms, the halogen atoms or the substituents may be identical to or different from each other.

The term of "chain hydrocarbon group" represents an alkyl group, an alkenyl group, or an alkynyl group.

Examples of the "alkyl group" include a methyl group, an ethyl group, a propyl group, an isopropyl group, a 1,1-dimethylpropyl group, a 1,2-dimethylpropyl group, a 1-ethylpropyl group, a butyl group, a sec-butyl group, an isobutyl group, a tert-butyl group, a pentyl group, and a hexyl group.

Examples of the "alkenyl group" include a vinyl group, a 1-propenyl group, a 2-propenyl group, a 1-methyl-1-propenyl group, a 1-methyl-2-propenyl group, a 1,2-dimethyl-1-propenyl group, a 1-ethyl-2-propenyl group, a 3-butenyl group, a 4-pentenyl group and a 5-hexenyl group.

Examples of the "alkynyl group" include an ethynyl group, a 1-propynyl group, a 2-propynyl group, a 1-methyl-2-propynyl group, a 1,1-dimethyl-2-propynyl group, a 1-ethyl-2-propynyl group, a 2-butynyl group, a 4-pentynyl group, and a 5-hexynyl group.

Examples of the "alkoxy group" include a methoxy group, an ethoxy group, a propoxy group, an isopropoxy group, a butoxy group, a tert-butoxy group, a pentyloxy group, a hexyloxy group, and an octyloxy group.

Examples of the "alkylsulfanyl group" include a methylsulfinyl group, an ethylsulfinyl group, a propylsulfinyl group, an isopropylsulfinyl group, a butylsulfinyl group, a tert-butylsulfinyl group, a pentylsulfinyl group, a hexylsulfinyl group, and an octylsulfinyl group.

Examples of the "alkenyloxy group" include a 2-propenyloxy group, a 2-butenyloxy group, and a 5-hexenyloxy group.

Examples of the "alkynyloxy group" include a 2-propynyloxy group, a 2-butynyloxy group, and a 5-hexynyloxy group.

The term of "carbocyclyl group" represents a ring aromatic carbocycle group, and an alicyclic hydrocarbon group.

Examples of the "aromatic carbocycle group" include a phenyl group and a naphthyl group.

The term of "alicyclic hydrocarbon group" represents a cycloalkyl group, a cycloalkenyl group, and the others.

Examples of the "cycloalkyl group" include a cyclopropyl group, a cyclobutyl group, a cyclopentyl group, a cyclohexyl group, and a cycloheptyl group.

Examples of the "cycloalkenyl group" include a cyclopropenyl group, a cyclobutenyl group, a cyclopentenyl group, a cyclohexenyl group, and a cycloheptenyl group.

The term of "heterocyclyl group" represents a cyclic group having one or more hetero atoms as a ring constitute atom, and represents an aromatic heterocyclic group and a non-aromatic heterocyclic group.

Examples of the "heterocyclyl group" include a pyrrolyl group, a furyl group, a thienyl group, a pyrazolyl group, an imidazolyl group, a triazolyl group, a tetrazolyl group, an oxazolyl group, an isoxazolyl group, a thiazolyl group, an isothiazolyl group, an oxadiazolyl group, a thiadiazolyl group, a pyridyl group, a pyridazinyl group, a pyrimidinyl group, a pyrazinyl group, a triazinyl group, a tetrazinyl group, a pyrrolidinyl group, an imidazolynyl group, an imidazolydinyl group, a piperidinyl group, a tetrahydropyrimidinyl group, a hexahydropyrimidinyl group, a piperazinyl group, an oxazolidinyl group, an isoxazolidinyl group, a 1,3-oxazinanyl group, a morpholinyl group, a thiazolidinyl group, an isothiazolidinyl group, a 1,3-thiazinanyl group, and a thiomorpholinyl group.

The following explains a method for producing a nucleic acid oligomer represented by formula (4) wherein a protecting group of the following formula (1) is deprotected, which comprises contacting a nucleic acid oligomer represented by formula (3) with a fluoride ion in the presence of a radical reaction inhibitor.

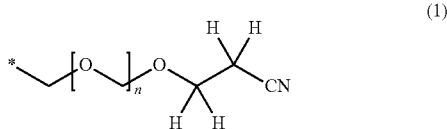

(1)

In formula (I), n is any integer of 0 or more, more preferably an integer of 0 to 3, more preferably an integer of 0 to 2, further preferably 0 or 1, and particularly preferably 1.

At least one group of R, W and X in formula (3) represents a hydroxy group protected with the protecting group of the above formula (1). For R, W and X, the ratio of formula (1) may be 1% or more, more preferably 5% or more, more preferably 10% or more, more preferably 20% or more, more preferably 30% or more, more preferably 40% or more, more preferably 50% or more, more preferably 60% or more, more preferably 70% or more, more preferably 80% or more, more preferably 90% or more, and further more preferably 95% or more. In addition, the chain length of a nucleic acid to be synthesized (such as base length, polymerization number of nucleic acid, and mer) is preferably 10 chain length or more, more preferably 20 chain length or more, more preferably 30 chain length or more, more preferably 40 chain length or more, and further more preferably 50 chain length or more.

In the deprotection step of the protecting group represented by formula (1), as a fluoride ion source, tetraalkylammonium fluoride is typically used.

Examples of the tetraalkylammonium fluoride include tetrabutylammonium fluoride or tetramethylammonium fluoride.

Tetrabutylammonium fluoride (TBAF) is particularly preferred. The amounts of the fluoride ion used is usually 1 to 1000 moles, preferably 1 to 500 moles, more preferably 2 to 200 moles, more preferably 4 to 100 moles, per 1 mole of the protecting group to be removed.

Examples of the radical reaction inhibitor include an inhibitor of radical chain reaction initiation, a radical scavenger, a peroxide decomposer and the others.

Examples of the inhibitor of radical chain reaction initiation include a metal deactivator, an ultraviolet absorber, a quencher and the others.

Examples of the metal deactivator include an amide compound, and a hydrazide type of compound, and the others, and specific examples thereof include n-octanohydrazide, succinic dihydrazide, 2-Hydroxy-N-1H-1,2,4-triazol-3-ylbenzamide, N'1,N'12-Bis(2-hydroxybenzoyl)dodecanedihydrazide, N,N'-Bis[3-(3,5-di-tert-butyl-4-hydroxyphenyl)propionyl]hydrazine, 1,3,5-Triazine-2,4,6-triamine, and the others.

Examples of the ultraviolet absorber include a triazole type of compound, a triazine type of compound, a benzophenone type of compound, and the others, and specific examples thereof include benzophenone, 2-(2H-Benzotriazol-2-yl)-4,6-bis(1-methyl-1-phenylethyl)phenol, 2-(2H-Benzotriazol-2-yl)-4-(1,1,3,3-tetramethylbutyl)phenol, 2,2'-Methylenebis[6-(2H-benzotriazol-2-yl)-4-(1,1,3,3-tetramethylbutyl)phenol], 2-(2H-Benzotriazol-2-yl)-p-cresol, 2-(5-chloro-2H-benzotriazol-2-yl)-6-tert-butyl-4-methylphenol, 2-(4,6-Diphenyl-1,3,5-triazin-2-yl)-5-[2-(2-ethylhexanoyloxy)ethoxy]phenol, 2,4,6-tris(2-hydroxy-4-hexyloxy-3-methylphenyl)-1,3,5-triazine, [2-hydroxy-4-(octyloxy)phenyl](phenyl)methanone, and the others.

Examples of the quencher include an organic nickel type of compound and the others. Specific examples thereof include bis(1,2-bis(2-methoxyphenyl)-1,2-ethylene dithiolato)nickel complex, Raney nickel, tetracarbonickel, $NiX_2$ $(PR_3)$ [wherein X represents a halogen atom, and $PR_3$ represents a phosphine ligand (for example, tertiary phosphine such as triphenyl phosphine and the others)].

Examples of the radical scavenger include a phenol type of antioxidant, a hindered amine type of light stabilizer (Hindered Amine Light Stabilizers; HALS) and the others.

Examples of the phenol type of antioxidant include a hindered phenol type of compound, a semihindered phenol type of compound, or a less hindered phenol type of compound and the others.

Examples of the phenol type of antioxidant includes the following compounds, but any generally used as a phenol type of antioxidant can be used in this embodiments.

A compound represented by the following formula (8).

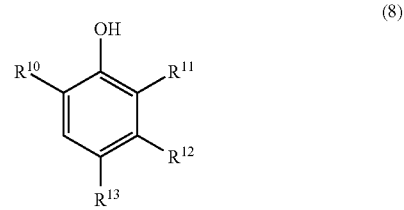

(8)

A compound of formula (8) wherein $R^{12}$ is a hydrogen atom can be shown by the following formula (8a).

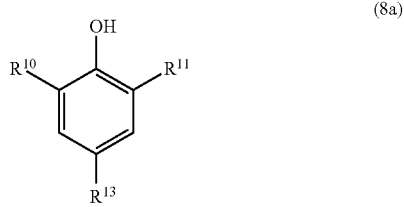

(8a)

A compound of formula (8) wherein $R^{11}$ is a hydrogen atom can be shown by the following formula (8b).

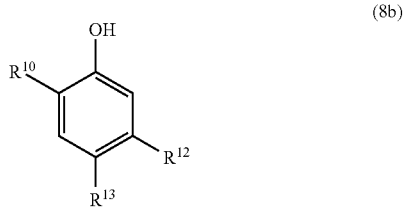

(8b)

In formula (8), formula (8a), and formula (8b), $R^{10}$ is preferably a tert-butyl group, a sec-butyl group, or a methyl group, and $R^{11}$ and $R^{12}$ are identical to or different from each other, and each represents preferably a tert-butyl group, a sec-butyl group, a methyl group, or a hydrogen atom, and $R^{13}$ is preferably a tert-butyl group, a sec-butyl group, a methyl group, a hydroxy group, or a hydrogen atom.

A compound represented by the following formula (13a).

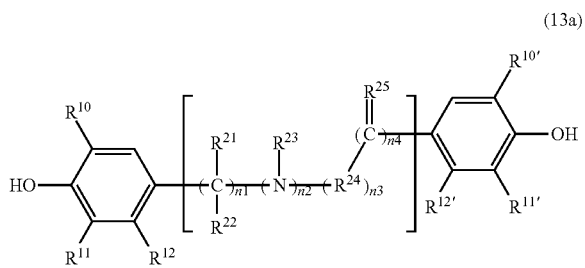

(13a)

(wherein the definitions of $R^{10}$, $R^{11}$ and $R^{12}$ are the same as those defined in formula (8), and $R^{10'}$, $R^{11'}$, $R^{12'}$, $R^{21}$, $R^{22}$, and $R^{23}$ are identical to or different from each other, and each represents a chain hydrocarbon group, a carbocyclyl group, a heterocyclyl group, an alkoxy group, an alkylsulfanyl group {the chain hydrocarbon group, the carbocyclyl group, the heterocyclyl group, the alkoxy group, the alkylsulfanyl group may optionally have one or more substituents}, $SiR^{51}R^{52}R^{53}$, an amide group, $C(O)R^{61}$, $OC(O)R^{61}$, a hydroxy group, or a hydrogen atom, $R^{24}$ represents an oxygen atom, a sulfur atom, $S(O)$, or $S(O)_2$, $R^{25}$ represents an oxygen atom or a sulfur atom, $n^1$, $n^2$, $n^3$, and $n^4$ each represents arbitrarily 0 or any positive integers, and the order of descriptions of $(CR^{21}R^{22})_{n1}$, $(NR^{23})_{n2}$, $(R^{24})_{n3}$, and $(C=R^{25})_{n4}$ may be arbitrary, and when a plurality of each of these groups respectively are existed, they may not be existed sequentially.

A compound represented by the following formula (13b).

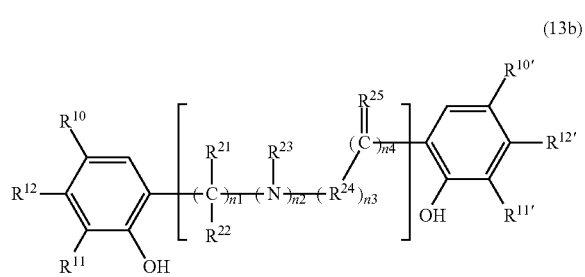

(13b)

(wherein the definitions of the symbols are the same as those defined in formula (13a).

A compound represented by the following formula (13c).

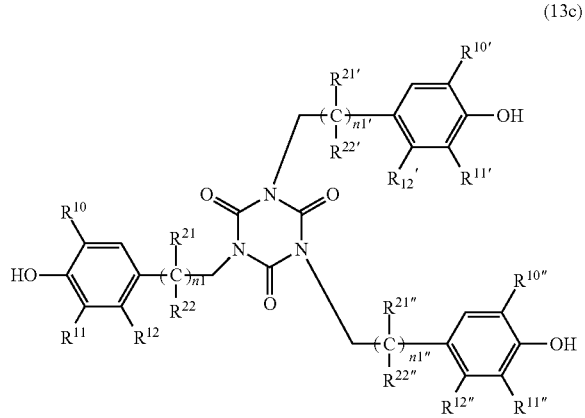

(13c)

(wherein the definitions of $R^{10}$, $R^{11}$, $R^{12}$, $R^{10'}$, $R^{11'}$, $R^{12'}$ and $n^1$ are the same as those defined in the above formula (13a), and $R^{10''}$, $R^{1''}$, $R^{12''}$, $R^{21'}$, $R^{22'}$, $R^{21''}$, and $R^{22''}$ are identical to or different from each other, and each represents a chain hydrocarbon group, a carbocyclyl group, a heterocyclyl group, an alkoxy group, an alkylsulfanyl group {the chain hydrocarbon group, the carbocyclyl group, the heterocyclyl group, the alkoxy group, the alkylsulfanyl group may optionally have one or more substituents}, $SiR^{51}R^{52}R^{53}$, an amide group, $C(O)R^{61}$, $OC(O)R^{61}$, a hydroxy group, or a hydrogen atom, and $n^{1'}$ and $n^{1''}$ each represents arbitrarily 0 or any positive integers).

A compound represented by the following formula (13d).

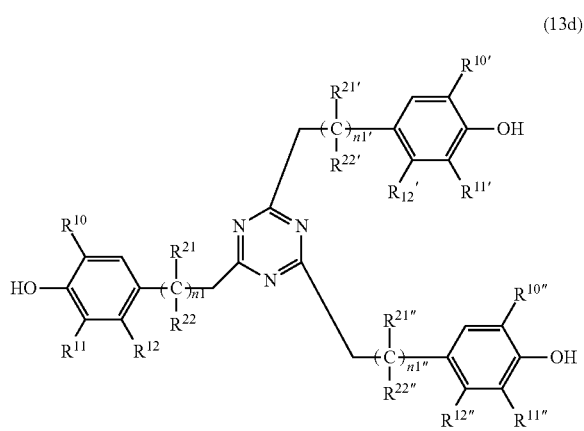

(13d)

(wherein the definitions of the symbols are the same as those defined in the formula (13c)).

A compound represented by the following formula (13e).

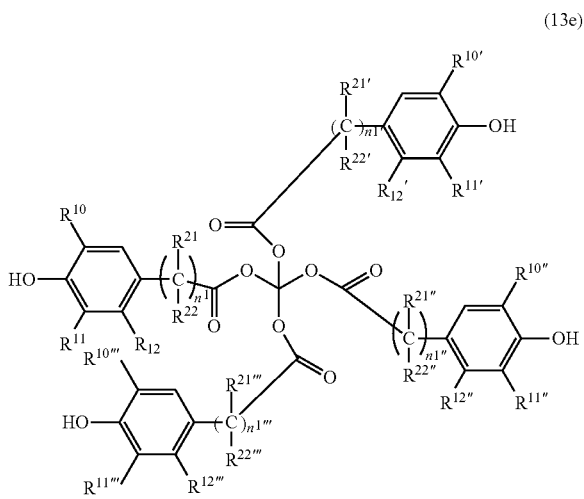

(13e)

(wherein the definitions of $R^{10}$, $R^{11}$, $R^{12}$, $R^{10'}$, $R^{11'}$, $R^{12'}$, $R^{10''}$, $R^{11''}$, $R^{12''}$, $R^{21'}$, $R^{22'}$, $R^{21''}$, $R^{22''}$, $n^1$, $n^{1'}$, and $n^{1''}$ are the same as those defined in the above formula (13c), and $R^{10'''}$, $R^{11'''}$, $R^{12'''}$, $R^{21'''}$, and $R^{22'''}$ are identical to or different from each other, and each represents a chain hydrocarbon group, a carbocyclyl group, a heterocyclyl group, an alkoxy group, an alkylsulfanyl group {the chain hydrocarbon group, the carbocyclyl group, the heterocyclyl group, the alkoxy group, and the alkylsulfanyl group may optionally have one or more substituents}, $SiR^{51}R^{52}R^{53}$, an amide group, $C(O)R^{61}$, $OC(O)R^{61}$, a hydroxy group, or a hydrogen atom, and n1" is arbitrarily 0 or any positive integers)

A compound represented by the following formula (13f).

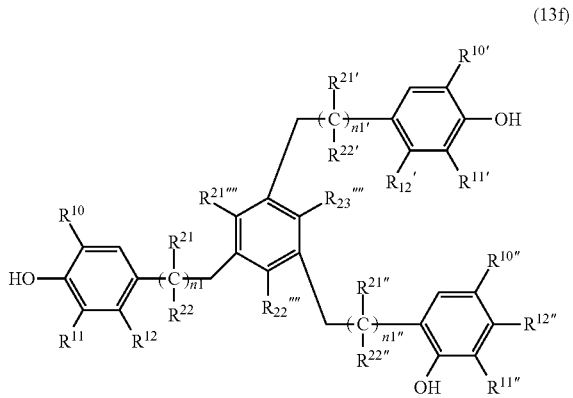

(13f)

(wherein the definitions of $R^{10}$, $R^{11}$, $R^{12}$, $R^{10'}$, $R^{11'}$, $R^{12'}$, $R^{10''}$, $R^{11''}$, $R^{12''}$, $R^{21}$, $R^{22}$, $R^{21'}$, $R^{22'}$, $n^1$, $n^{1'}$, and $n^{1''}$ are the same as those defined in the above formula (13c), and $R^{21''''}$, $R^{22''''}$, and $R^{23''''}$ are identical to or different from each other, and each represents a chain hydrocarbon group, a carbocyclyl group, a heterocyclyl group, an alkoxy group, an alkylsulfanyl group {the chain hydrocarbon group, the carbocyclyl group, the heterocyclyl group, the alkoxy group, the alkylsulfanyl group may optionally have one or more substituents}, $SiR^{51}R^{52}R^{53}$, an amide group, $C(O)R^{61}$, $OC(O)R^{61}$, a hydroxy group, or a hydrogen atom)

Examples of the substituents which optionally contained by the chain hydrocarbon group, the carbocyclyl group, the heterocyclyl group, the alkoxy group, and the alkylsulfanyl group in $R^{10}$, $R^{11}$, $R^{12}$, $R^{13}$, $R^{10'}$, $R^{11'}$, $R^{12'}$, $R^{21}$, $R^{22}$, $R^{23}$, $R^{10''}$, $R^{11''}$, $R^{12''}$, $R^{21'}$, $R^{22'}$, $R^{21''}$, $R^{22''}$, $R^{10'''}$, $R^{11'''}$, $R^{12'''}$, $R^{21'''}$, $R^{22'''}$. $R^{21''''}$, $R^{22''''}$, and $R^{23''''}$ include a halogen atom, a carbocyclyl group, a heterocyclyl group, a hydroxy group, an amino group, an alkoxy group, a sulfanyl group, an alkylsulfanyl group, $SiR^{51}R^{52}R^{53}$, $O(SiR^{51}R^{52}R^{53})$, $C(O)R^{61}$, $OC(O)R^{61}$, and $P(O)(OR^{62})_2$. Here $R^{62}$ represents a chain hydrocarbon group.

Specific examples of the phenol type of antioxidant include 2,6-di-tert-butyl-p-cresol, 4-sec-butyl-2,6-di-tert-butylphenol, 6-tert-butyl-2,4-xylenol, 4,6-d-tert-butyl-m-cresol, 1,4-dihydroxybenzene, 2,6-Di-tert-butyl-4-ethylphenol, 4,4'-Dihydroxy-3,3',5,5'-tetraisopropylbiphenyl, 3-(3,5-Di-tert-butyl-4-hydroxyphenyl)-N'-[3-(3,5-di-tert-butyl-4-hydroxyphenyl)propanoyl]propanehydrazide, Methyl 3-(3, 5-Di-tert-butyl-4-hydroxyphenyl)propionate, 2,2'-Methylenebis(6-tert-butyl-4-ethylphenol), 2,2'-Methylenebis[6-(1-methylcyclohexyl)-p-cresol], 1,3,5-Tris (3,5-di-tert-butyl-4-hydroxybenzyl)-1,3,5-triazinane-2,4,6-trione, 2,5-Bis(1,1,3,3-tetramethylbutyl)hydroquinone, 2,5-Di-tert-butylhydroquinone, 4,4'-Butylidenebis(6-tert-butyl-m-cresol), 4-(Hexyloxy)-2,3,6-trimethylphenol, N,N'-(Hexane-1,6-diyl)bis[3-(3,5-di-tert-butyl-4-hydroxyphenyl) propanamide], 2,2',6,6'-Tetra-tert-butyl-4,4'-dihydroxybiphenyl, 2,5-Di-tert-amylhydroquinone, 2,4-Bis [(dodecylthio)methyl]-6-methylphenol, 4-[[4,6-Bis(n-octylthio)-1,3,5-triazin-2-yl]amino]-2,6-di-tert-butylphenol, Galvinoxyl Free Radical, Pentaerythritol Tetrakis[3-(3,5-di-tert-butyl-4-hydroxyphenyl)propionate], Hexadecyl 3,5-Di-tert-butyl-4-hydroxybenzoate, 4,4'-Thiobis(6-tert-butyl-m-cresol), 3,3',5,5'-Tetra-tert-butyl-4,4'-stilbenequinone, 2,4,6-Tris(3',5'-di-tert-butyl-4'-hydroxybenzyl)mesitylene, 2,6-Di-tert-butyl-4-methoxyphenol, 2,2'-Methylenebis(6-cyclohexyl-p-cresol), [Oxalylbis(azanediyl)]bis(ethane-2,1-diyl) Bis[3-(3,5-di-tert-butyl-4-hydroxyphenyl)propanoate], 3,6-Dihydroxybenzonorbornane, 2-Methyl-4,6-bis[(n-octylthio)methyl]phenol, 2,6-Di-tert-butylphenol, 2,4,8,10-Tetraoxaspiro[5.5]undecane-3,9-diylbis(2-methylpropane-2,1-diyl) Bis[3-[3-(tert-butyl)-4-hydroxy-5-methylphenyl] propanoate], Diethyl 3,5-Di-tert-butyl-4-hydroxybenzylphosphonate, 2,4,6-Tris(2,4-dihydroxyphenyl)-1,3,5-triazine, 2-tert-Butyl-6-(3-tert-butyl-2-hydroxy-5-methylbenzyl)-4-methylphenyl Acrylate, Triethylene Glycol Bis[3-(3-tert-butyl-4-hydroxy-5-methylphenyl)propionate], 3-(3,5-Di-tert-butyl-4-hydroxyphenyl)propionic Acid, Stearyl 3-(3,5-Di-tert-butyl-4-hydroxyphenyl)propionate, 4,6-Di-tert-butylresorcinol, 1,3,5-tris(3, 5-di-tert-butyl-4-hydroxybenzyl)-1,3,5-triazine-2,4,6(1H, 3H,5H)-trione, 4,4',4''-(1-methylpropanyl-3-ylidene)tris(6-tert-butyl-m-cresol), 6,6'-di-tert-butyl-4,4'-butylidenedi-m-cresol, Octadecyl 3-(3,5-di-tert-butyl-4-hydroxyphenyl) propionate, Pentaerythritol tetrakis[3-(3,5-di-tert-butyl-4-hydroxyphenyl)propionate], 3,9-Bis{2-[3-(3-tert-butyl-4-hydroxy-5-methylphenyl)propionyloxy]-1,1-dimethylethyl}-2,4,8,10-tetraoxaspiro[5.5]undecane, 1,3,5-tris(3,5-di-tert-butyl-4-hydroxyphenylmethyl)-2,4,6-trimethylbenzene, and the others.

Examples of the hindered amine light type of stabilizer (HALS) include the following compounds, but any generally used as a phenol type of antioxidant can be used in this embodiments.

A compound represented by the following formula (12).

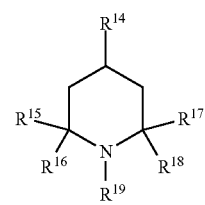

(12)

In formula (12), $R^{15}$, $R^{16}$, $R^{17}$, and $R^{18}$ are preferably a methyl group.

A compound represented by formula (12) wherein $R^{15}$, $R^{16}$, $R^{17}$, and $R^{18}$ are a methyl group can be shown in the following formula (12A).

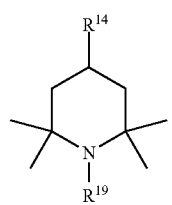

(12A)

A compound represented by the following formula (12a).

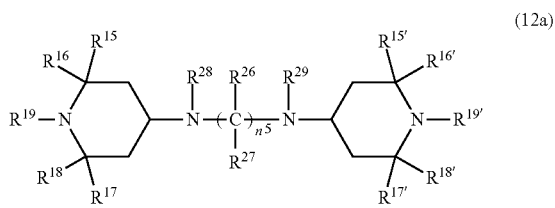

(12a)

(wherein the definitions of $R^{15}$, $R^{16}$, $R^{17}$, $R^8$, and $R^{19}$ are the same as those defined in the above formula (12), $R^{19'}$ represents an alkyl group, an alkoxy group, an oxygen free radical, a hydroxy group, or a hydrogen atom, $R^{15'}$, $R^{16'}$, $R^{17'}$, $R^{18'}$, $R^{26}$, $R^{27}$, $R^{28}$, and $R^{29}$ are identical to or different from each other, and each represents an alkyl group or a hydrogen atom, and $n^5$ is arbitrarily 0 or any positive integers.)

A compound represented by the following formula (12b).

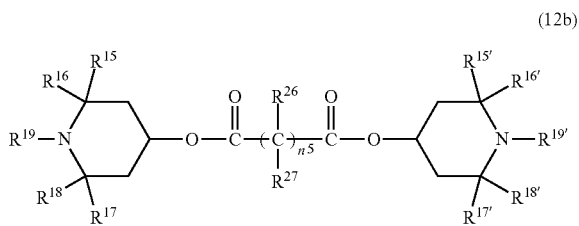

(12b)

(wherein the definitions of symbols are the same as those defined in the above formula (12a).)

A compound represented by the following formula (12c).

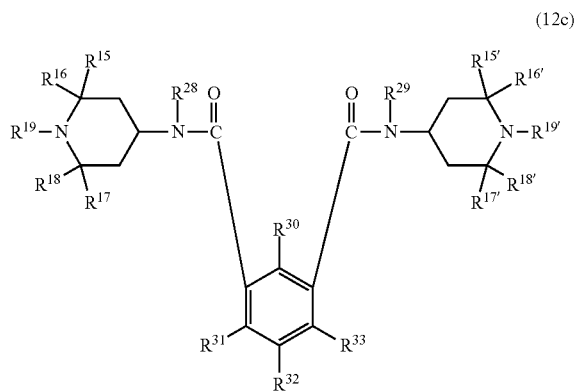

(12c)

(wherein the definitions of $R^{15}$, $R^{16}$, $R^{17}$, $R^{18}$, $R^{19}$, $R^{15'}$, $R^{16'}$, $R^{17'}$, $R^{18'}$, $R^{19'}$, $R^{28}$, and $R^{29}$ are the same as those defined in the above formula (12a) and $R^{30}$, $R^{31}$, $R^{32}$, and $R^{33}$ are identical to or different from each other, and each represents an alkyl group or a hydrogen atom)

Examples of the substituents that may be contained by the chain hydrocarbon group, the carbocyclyl group, the heterocyclyl group, the alkoxy group, and the alkylsulfanyl group in $R^{20}$ include a halogen atom, a carbocyclyl group, a heterocyclyl group, a hydroxy group, an amino group, an alkoxy group, a sulfanyl group, an alkylsulfanyl group, $SiR^{54}R^{55}R^{56}$, $O(SiR^{51}R^{52}R^{53})$, $C(O)R^{63}$, $OC(O)R^{63}$, and $P(O)(OR^{64})_2$. Here $R^{63}$ represents a chain hydrocarbon group, and $R^{62}$ represents a chain hydrocarbon group.

The alkyl group in $R^{15}$, $R^{16}$, $R^{17}$, $R^{18}$, $R^{19}$, $R^{15'}$, $R^{16'}$, $R^{17'}$, $R^{18'}$, $R^{26}$, $R^{27}$, $R^{28}$, and $R^{29}$ may optionally have substituents such as phenyl group that may optionally have substituent(s) (for example, an alkyl group, a hydroxy group).

Specific examples of the hindered amine light type of stabilizer (HALS) include Bis(2,2,6,6-Tetramethyl-4-pyperidyl) Sebacate, 2,2,6,6-Tetramethyl-4-pyperidyl Methacrylate, or 2,2,6,6-Tetramethylpiperidine 1-oxyl-free radical (TEMPO free radical), N,N'-Bis(2,2,6,6-tetramethylpiperidin-4-yl)hexane-1,6-diamine, 2,2,6,6-tetramethylpiperidine 1-oxyl, Bis(2,2,6,6-tetramethyl-4-piperidyl-1-oxyl) Sebacate, Bis(1,2,2,6,6-pentamethyl-4-piperidyl) Sebacate, Bis (2,2,6,6-tetramethyl-4-piperidyl) Sebacate, 1,2,2,6,6-Pentamethyl-4-piperidyl Methacrylate, $N^1,N^3$-Bis(2,2,6,6-tetramethylpiperidin-4-yl)isophthalamide, Bis(1,2,2,6,6-pentamethyl-4-piperidyl) Butyl(3,5-di-tert-butyl-4-hydroxybenzyl)malonate, 2,2,6,6-Tetramethyl-4-piperidyl Methacrylate, Tetrakis(1,2,2,6,6-pentamethyl-4-piperidyl) butane-1,2,3,4-tetracarboxylate, Tetrakis(2,2,6,6-tetramethyl-4-piperidyl) butane-1,2,3,4-tetracarboxylate, 1,2,3,4-Butanetetracarboxylic acid, tetramethyl ester, reaction products with 1,2,2,6,6-pentamethyl-4-piperidinol and β, β, β', β'-tetramethyl-2,4,8,10-tetraoxaspiro[5.5]undecane-3,9-diethanol, 1,2,3,4-Butanetetracarboxylic acid, tetramethyl ester, reaction products with 2,2,6,6-tetramethyl-4-piperidinol and β, β, β', β'-tetramethyl-2,4,8,10-tetraoxaspiro[5.5]undecane-3,9-diethanol, Bis(1,2,2,6,6-pentamethyl-4-piperidyl) Sebacate, Bis(2,2,6,6-tetramethyl-4-piperidyl) Sebacate, Bis(1-undecanoxy-2,2,6,6-tetramethylpiperidin-4-yl)carbonate, 1,2,2,6,6-Pentamethyl-4-piperidyl Methacrylate, 2,2,6,6-Tetramethyl-4-piperidyl Methacrylate, reaction mass of: 2,2,6,6-tetramethylpiperidin-4-yl hexadecanoate 2,2,6,6-tetramethylpiperidin-4-yl octadecanoate, or 2,2,6,6-tetramethylpiperidin-4-yl hexadecanoate 2,2,6,6-tetramethylpiperidin-4-yl octadecanoate, and the others.

Examples of the peroxide decomposer include a phosphorus type of antioxidant and a sulfur type of antioxidant. Examples of the phosphorus type of antioxidant include a phosphine compound, and a phosphite compound and the others, and specific examples thereof include triphenylphosphine, triphenylphosphite, 3,9-Bis(octadecyloxy)-2,4,8,10-tetraoxa-3,9-diphosphaspiro[5.5]undecane, 3,9-Bis(2,6-di-tert-butyl-4-methylphenoxy)-2,4,8,10-tetraoxa-3,9-diphosphaspiro[5.5]undecane, 2,2'-Methylenebis(4,6-di-tert-butylphenyl) 2-ethylhexyl phosphite, Tris(2,4-ditert-butylphenyl) phosphite, Tris(nonylphenyl) phosphite, Tetra-C12-15-alkyl (propane-2,2-diylbis(4,1-phenylene)) bis (phosphite), 2-Ethylhexyl diphenyl phosphite, Isodecyl diphenyl phosphite, Triisodecyl phosphite, and the others. Examples of the sulfur type of antioxidant include a sulfide type of compound, and specific examples thereof include Dioctadecylsulfide, 2,2-Bis{[3-(dodecylthio)-1-oxopropoxy]methyl}propane-1,3-diyl bis[3-(dodecylthio)propionate], Di(tridecyl) 3,3'-thiodipropionate, and the others.

The amount of the radical reaction inhibitor used is the molar amount to 1 mole of the mole number which is calculated by multiplying a mole number of the nucleic acid oligomer represented by formula (3) by the number of the case where R represents a group represented by formula (1) in the formula (3), which is within a range of usually 10 moles or less, 9 moles or less, 8 moles or less, 6 moles or less, 5 moles or less, 4 moles or less, 3 moles or less, 2 moles or less, 1.5 moles or less, 1.3 moles or less, or 1.1 moles or less, and 0.001 moles or more, 0.01 moles or more, 0.05 moles or more, 0.1 moles or more, or 0.5 moles or more, and preferably 0.01 to 10 moles, 0.01 to 8 moles, 0.05 to 8 moles, 0.05 to 5 moles, 0.1 to 5 moles, 0.1 to 4 moles, 0.1 to 3 moles, 0.1 to 2 moles, 0.1 to 1.5 moles, 0.1 to 1.3 moles, 0.1 to 1.1 moles, 0.5 to 5 moles, 0.5 to 4 moles, 0.5 to 3 moles, 0.5 to 2 moles, 0.5 to 1.5 moles, 0.5 to 1.3 moles, 0.5 to 1.2 moles, or 0.5 to 1.1 moles.

When the radical reaction inhibitor is the hindered amine light stabilizer, the amount of the hindered amine light stabilizer used is the molar amount to 1 mole of the mole number which is calculated by multiplying a mole number of the nucleic acid oligomer represented by formula (3) by the number of the case where R represents a group represented by formula (1) in the formula (3), which is within a range of preferably 5 moles or less, 4 moles or less, 3 moles or less, 2 moles or less, 1.5 moles or less, 1.3 moles or less, or 1.1 moles or less, and 0.001 moles or more, 0.01 moles or more, 0.05 moles or more, 0.1 moles or more, or 0.5 moles or more, and more preferably 0.01 to 5 moles, 0.1 to 5 moles, 0.1 to 4 moles, 0.1 to 2 moles, 0.1 to 1.5 moles, 0.1 to 1.3 moles, 0.1 to 1.1 moles, 0.5 to 5 moles, 0.5 to 4 moles, 0.5 to 3 moles, 0.5 to 2 moles, 0.5 to 1.5 moles, 0.5 to 1.3 moles, 0.5 to 1.2 moles, or 0.5 to 1.1 moles.

In this step, usually, organic solvent which is inactive to the reaction is used, and specific examples thereof include sulfoxide solvents, nitrile solvents, ether solvents, amide solvents, ketone solvents, aliphatic hydrocarbon solvents, ester solvents, aromatic solvents, or a mixed solvents of two or more of these solvents, and among these solvents, sulfoxide solvents are preferred. Examples of the sulfoxide solvents include dimethyl sulfoxide and the others. Examples of the nitrile solvents include acetonitrile, propionitrile, and the others. Examples of the ether solvents include tetrahydrofuran and the others. Examples of the amide solvents include N-methyl-2-pyrrolidone and the others. Examples of the ketone solvents include acetone, methyl ethyl ketone, and the others. Examples of the aliphatic hydrocarbon solvents include hexane, heptane, and the others. Examples of the ester solvents include methyl acetate, ethyl acetate, and the others. Examples of the aromatic solvents include toluene, pyridine, and the others. Dimethyl sulfoxide, or a mixed solvent of dimethyl sulfoxide and acetonitrile is particularly preferred.

The fluoride ion source, which is the reagent used in the step of deprotecting the protecting group represented by formula (1), is usually dehydrated after being dissolved in a solvent before use. Examples of the dehydrating agents include molecular sieve, and sulfate salts, and the others, and molecular sieve 4 A is preferably used.

The amount of the solvent used is usually 5 to 8,000 L, preferably 50 to 2,000 L, and more preferably 100 to 1,600 L, per mole of the nucleic acid oligomer subjected to the deprotecton step.

If necessary, a capturing compound that reacts with a compound represented by the following formula (2), which is a by-product of this step, can be added to capture the compound. Examples of the capturing compound include nitroalkanes, alkylamines, amidines, thiols, thiol derivatives, or mixtures of two or more of these compounds. Examples of "nitroalkanes" include nitromethane. Examples of "alkylamines" include an straight chain alkylamine having 1 to 6 carbon atoms, and a cyclic amine having 1 to 8 carbon atoms. Specific examples thereof include methylamine, ethylamine, n-propylamine, n-butylamine, n-pentylamine, n-hexylamine, morpholine, and piperidine. Examples of "amidines" include benzamidine, and formamidine. Examples of "thiols" include a straight chain thiol having 1 to 6 carbon atoms. Specific examples of thiols include methanethiol, ethanethiol, 1-propanethiol, 1-butanethiol, 1-pentanethiol, and 1-hexanethiol. Examples of "thiol derivatives" include alcohols or ethers containing the straight chain alkylthiol groups containing 1 to 6 carbon atoms wherein the straight chain alkylthiol groups are identical to or different from each other. Specific examples of thiol derivatives include 2-mercaptoethanol, 4-mercapto-1-butanol, 6-mercapto-1-hexanol, mercaptomethyl ether, 2-mercaptoethyl ether, 3-mercaptopropyl ether, 4-mercaptobutyl ether, 5-mercaptopentyl ether, and 6-mercaptohexyl ether. Nitromethane is more preferably used.

formula (2)

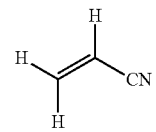

(2)

The amount of the compound used which captures the compound represented by formula (2), which is a by-product, can be 0.1 to 100.0 moles %, preferably 1.0 to 50.0 moles %, and more preferably 2.0 to 40.0 moles %, per the fluoride ion source which deprotects the protecting group of the hydroxy group represented by formula (1).

In the reaction of a nucleic acid oligomer represented by formula (3) with a fluoride ion, the fluoride ion may be added to the nucleic acid oligomer represented by formula (3), on the contrary, the nucleic acid oligomer represented by formula (3) may be added to the fluoride ion, or alternatively, both of them may be added simultaneously. The method where the fluoride ion is added to the nucleic acid oligomer represented by formula (3) is preferred.

The time required for addition of a whole amounts of the fluoride ion to the nucleic acid oligomer represented by formula (3) is preferably 5 minutes or more, more preferably 10 minutes or more, more preferably 15 minutes or more, more preferably 30 minutes or more, and further more preferably by dropwise addition over 1 hour or more.

Such addition is preferably carried out by dropwise addition to the surface of or into the solution containing the nucleic acid oligomer represented by formula (3) over 5 minutes or more, more preferably over 10 minutes or more, more preferably over 15 minutes or more, more preferably over 30 minutes or more, and further more preferably over 1 hour or more.

Preferably, the radical reaction inhibitor is existed in the reaction system before the addition of the fluoride ion.

When adding the fluoride ion to the nucleic acid oligomer represented by formula (3), the temperature(s) of both or either of the solutions may be 80° C. or less, preferably both of them are 40° C. or less, preferably both of them are 35° C. or less, more preferably both of them are 30° C. or less, more preferably both of them are 25° C. or less, more preferably both of them are 20° C. or less, more preferably both of them are 15° C. or less, more preferably both of them are 10° C. or less, and further more preferably both of them are 5° C. or less.

After the completion of the addition of the fluoride ion to the nucleic acid oligomer represented by formula (3), the temperature of the reaction mixture may be kept for 1 minute or more, preferably for 5 minutes or more, more preferably for 10 minutes or more, more preferably for 15 minutes or more, more preferably for 30 minutes or more, and further more preferably for 1 hour or more.

In addition, after keeping the temperature, the temperature of the reaction mixture may be raised, may be raised to the range of 5° C. to 80° C., preferably to 10° C. to 40° C., preferably to 10° C. to 35° C., preferably to 15° C. to 35° C., more preferably to 20° C. to 35° C., and further preferably to 25° C. to 35° C.

Further, after the raising the temperature, the duration for the deprotection reaction may be varied depending on the type of deprotecting agent to be used, or the reaction temperature, but is usually 1 hour to 100 hour(s), preferably 1 hour to 24 hour(s), more preferably 2 hours to 12 hours, and further more preferably 3 hours to 6 hours.

Here the fluoride ion may be added at arbitrary timings.

Stirring of the reaction system during the deprotection reaction of the protecting group is not essential, but usually, stirring is conducted with a stirring power Pv in the range of 0.0 to 0.5 kW/m$^3$, and preferably with a stirring power Pv in the range of 0.1 to 0.3 kW/m$^3$.

As the measures for separation and purification of the nucleic acid oligomer produced by the reaction from the reaction mixture, conventional methods can be adopted, and for example, using the measures such as extraction, concentration, neutralization, filtration, centrifugation, recrystalization, silicagel column chromatography, thin layer chromatography, reverse-phase column chromatography, ion exchange column chromatography, gel permeation column chromatography, hydrophobic interaction chromatography, hydrophilic interaction chromatography, affinity chromatography, precipitation (such as precipitation of nucleic acid oligomer using ethanol, isopropanol, methanol, or polyethylene glycol), dialysis, and ultrafiltration can isolate a purified nucleic acid oligomer. The isolated nucleic acid oligomer can be usually obtained as a nucleic acid oligomer having a hydroxy group at its 5' terminal protected.

The reaction to obtain a nucleic acid oligomer represented by the following formula (4) by deprotecting a protecting group represented by formula (1) from a nucleic acid oligomer represented by formula (3) is described below (Scheme 1).

Scheme 1

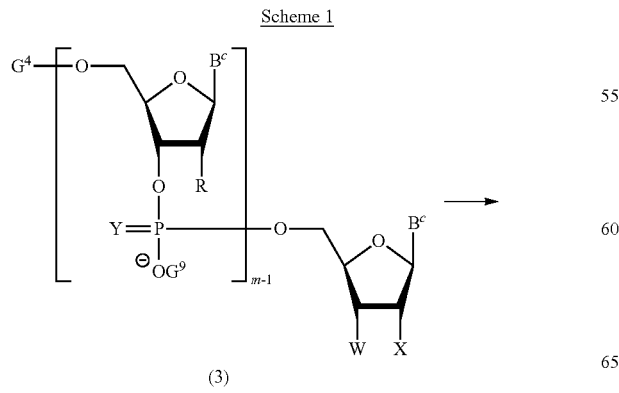

(3)

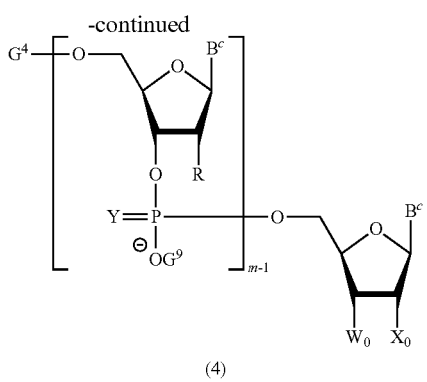

(4)

wherein,
G$^4$ represents a hydrogen atom or a protecting group of a hydroxy group,
G$^9$ represents an ammonium ion, an alkylammonium ion, an alkali metal ion, a hydrogen ion or a hydroxyalkylammonium ion,
B$^c$ represents a nucleobase, each of which is independently identical to or different from each other,
R is identical to or different from each other and each independently represents a hydrogen atom, a fluorine atom or an OQ group,
Q is identical to or different from each other and each independently represents a tert-butyldimethylsilyl group, a methyl group, a 2-methoxyethyl group, a methylene group which is bonded to the carbon atom at the 4' position of the ribose, an ethylene group which is bonded to the carbon atom at the 4' position of the ribose, an ethylidene group which is bonded to the carbon atom at the 4' position of the ribose, or a protecting group represented by the following formula (1):

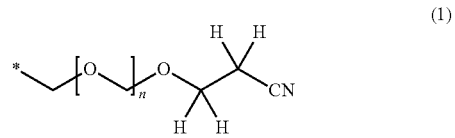

(wherein
the bond marked with * represents a bond with the oxygen atom of the OQ group, and
n represents any integer of 0 or more),
Y is identical to or different from each other and each independently represents an oxygen atom or a sulfur atom,
m represents any integer from 2 to 200,
W and X are defined as either the following (a) or (b):
(a) when W is a hydroxy group, X is the same as defined as those of the above R group,
(b) when X is a hydroxy group, W represents an OV group,
V represents a tert-butyldimethylsilyl group or the group of the above formula (1).
with proviso that at least one group of the above R, W and X represents a hydroxy group protected with the protecting group of the above formula (1), and
when m is an integer of 3 or more, the nucleic acid oligomer represented by formula (3) is a nucleic acid oligomer in which a non-nucleotide linker may be incorporated instead of the p nucleotides (with the proviso that p is a positive integer satisfying the equation: m−1>p) between the respective nucleotides at the 5' terminal and the 3' terminal)

In formula (3) or formula (4), when R represents an OQ group, and R' represents an OQ' group, a structure of a ribose is represented by the following formula (LNA-1), (LNA-2) or (LNA-3).

LNA-1

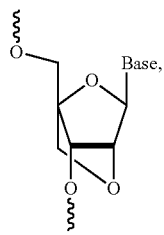

LNA-2

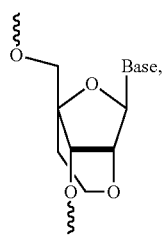

LNA-3

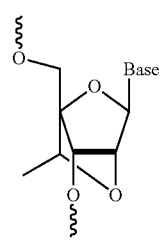

(wherein Base represents a nucleobase.)

As the nucleoside (such as ribose, and deoxyribose) contained in the nucleic acid oligomer used in the embodiment described herein, DNA, RNA, 2'-O-MOE (2'-O-methoxyethyl), 2'-O-Me, 2'-F RNA, and the above LNA are exemplified, but the above nucleoside is not limited thereto.

The nucleic acid oligomer represented by formula (3) can be obtained, for example, by cleaving a nucleic acid oligomer represented by formula (5), which is produced by solid-phase synthesis, from a solid support, as shown in Scheme 2.

Scheme 2

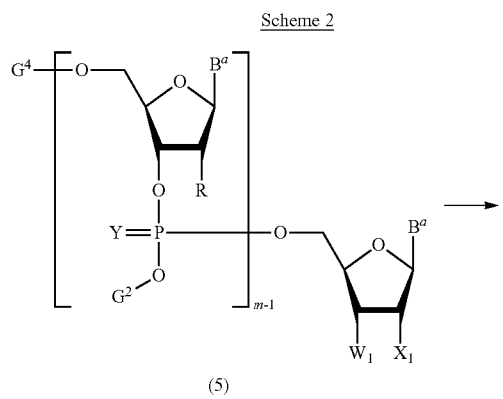

(5)

-continued

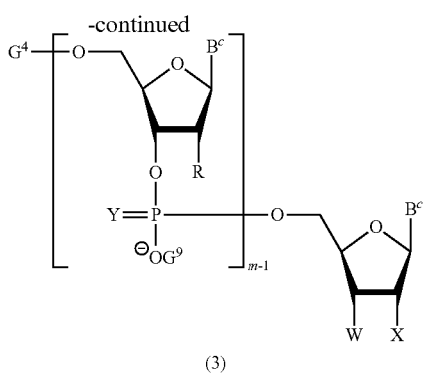

(3)

The nucleic acid oligomer represented by formula (5) which is synthesized on a solid support is explained, The substituent group $B^a$ may be a nucleobase, each of which is independently identical to or different from each other, $G^4$ and Y are the same as those defined in the above formula (3), $G^2$ represents a protecting group of a phosphoric acid, each of which is independently identical to or different from each other, when $X_1$ represents OZ, $W_1$ represents an OV group, V represents a tert-butyldimethylsilyl group or the group of the above formula (1).

when $X_1$ represents an R group, $W_1$ represents a group represented by OZ,

Z represents a group consisting of a solid support and a connection group connecting the solid support and the oxygen atom of a hydroxy group at the 2' position or the 3' position of the ribose at the 3' terminal of the nucleic acid oligomer.

More specifically, Z represents a structure represented schematically by the following formula (6):

-{Sp}-[Linker]-[Solid Support]]      (6)

In formula (6), Sp represents a spacer.

The Spacer (Sp) is exemplified by a group having a structure represented by the following formula (7).

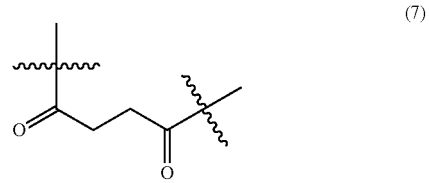 [SMILES: *C(=O)CCC(*)=O]

(7)

The Linker represents a structure which is a linker (connection structure). The Linker may be any structure represented by the following formula (8-1), (8-2), (8-3), (8-4), (8-5), (8-6), (8-7), or (8-8).

The solid support represents a structure which is a solid carrier. Examples of the solid support include an inorganic porous support, and organic resin support, and the others. Examples of the inorganic porous support include Controller pore Glass (CPG) and zeolite. Examples of the organic resin support include a support composed of polystyrene.

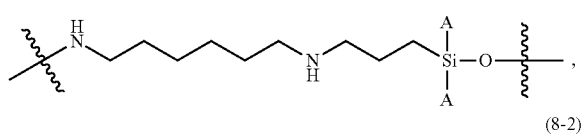

(8-2)

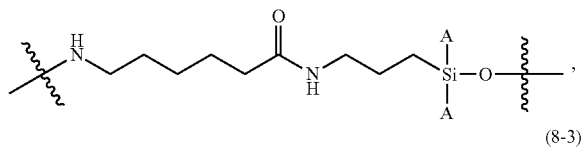

(8-3)

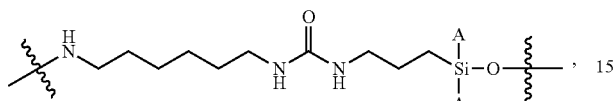

(8-4)

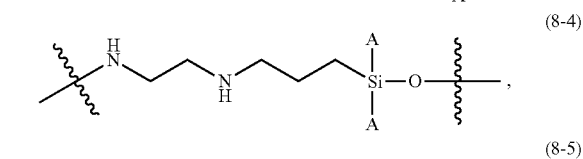

(8-5)

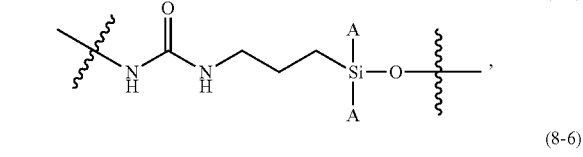

(8-6)

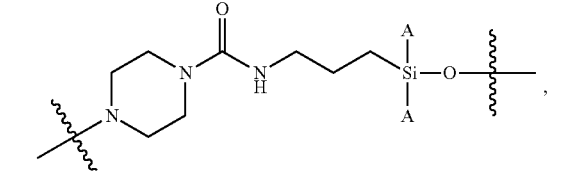

(8-7)

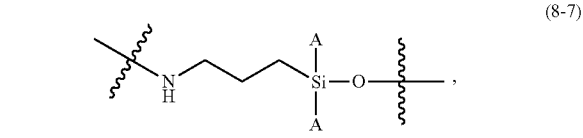

(8-8)

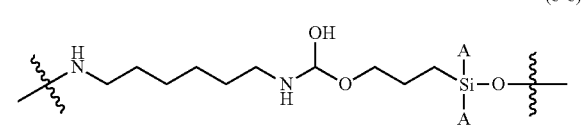

(wherein A may represent a hydroxy group, an alkoxy group, or an alkyl group. Examples of the alkoxy group include a methoxy group and an ethoxy group. Examples of the alkyl group include a methyl group, an ethyl group, an isopropyl group, and a n-propyl group. Si represents a binding to an oxygen atom of a hydroxy group in a support surface.)

$G^4$ represents a hydrogen atom or a protecting group of a hydroxy group, and when it represents a protecting group, it represents the same protecting group as $G^1$. When $G^4$ is deprotected, it is a hydrogen atom, and the nucleotide compound in that case is also provided in a series of steps for nucleic acid elongation reaction.

$G^9$ represents an ammonium ion, an alkylammonium ion, an alkali metal ion, a hydrogen ion, a hydroxyalkylammonium ion, or the others. As alkyl ammonium ion, specific examples of alkyl part include methyl, ethyl, n-propyl, isopropyl, n-butyl, dibutyl, isobutyl, tert-butyl, n-pentyl, isopentyl, hexyl and the others, and specific examples thereof include diethyl ammonium ion, triethyl ammonium ion, tetrabutyl ammonium ion, hexyl ammonium ion, and dibutyl ammonium ion, and the others. Examples of alkali metal ion include sodium ion, lithium ion and the others. Also, as hydroxyalkylammonium ion, specific examples of hydroxyalkyl part include hydroxymethyl, hydroxyethyl, hydroxy-n-propyl, hydroxy isopropyl, hydroxy-n-butyl, tris-hydroxymethyl and the others, and more specific examples of hydroxyalkylammonium ion include trishydroxymethyl-ammonium ion and the others.

The above compound of formula (5) is produced, for example, by the amidite method using an amidite compound of the following formula (A13).

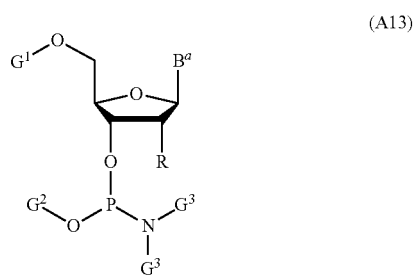

(A13)

(wherein
R represents a hydrogen atom, a fluorine atom, or an OQ group,

Q represents a tert-butyldimethylsilyl group, a methyl group, a 2-methoxyethyl group, a methylene group which is bonded to the carbon atom at the 4' position, an ethylene group which is bonded to the carbon atom at the 4' position, an ethylidene group which is bonded to the carbon atom at the 4' position, or a protecting group represented by the above formula (1), $B^a$ represents a nucleobase which may be optionally protected, $G^1$ presents a protecting group of a hydroxy group, $G^2$ represents a protecting group of a phosphoric acid, and $G^3$ represents an alkyl group, or a cyclic structure wherein both of $G^3$ may binds to each other at the respective terminal).

$B^a$ represents a nucleobase represented by B or a nucleobase wherein the nucleobase is protected by a protecting group.

A nucleobase in $B^a$ is not particularly limited. Examples of the nucleobase include adenine, cytosine, guanine, uracil, thymine, 5-methylcytosine, pseudouracil, 1-methylpseudouracil, and the others. Also, the nucleobase may be optionally substituted with substituent(s). Examples of the substituent include a halogen atom (such as a fluoro group, a chloro group, a bromo group, and an iodo group), an acyl group (such as an acetyl group), an alkyl group (such as a methyl group and an ethyl group), an arylalkyl group (such as a benzyl group), an alkoxy group (such as a methoxy group), an alkoxyalkyl group (such as a methoxyethyl group), a cyanoalkyl group (such as a cyanoethyl group), a hydroxy group, a hydroxyalkyl group, an acyloxymethyl group, an amino group, a monoalkylamino group, a dialkylamino group, a carboxy group, a cyano group, a nitro group and the others, as well as combinations of two or more of these substituents.

When the nucleobase has an amino group outside the ring, the protecting group of the amino group is not particularly limited, and a publicly known protecting group used in nucleic acid chemistry may be used, and examples of the protecting group include a benzoyl group, a 4-methoxybenzoyl group, an acetyl group, a propionyl group, a butyryl group, an isobutyryl group, a phenylacetyl group, a phenoxyacetyl group, a 4-tert-butylphenoxyacetyl group, a 4-isopropylphenoxyacetyl group, and (dimethylamino)methylene group, as well as combinations of two or more of these protecting groups.

$B^a$ represents more specifically any groups indicated below.

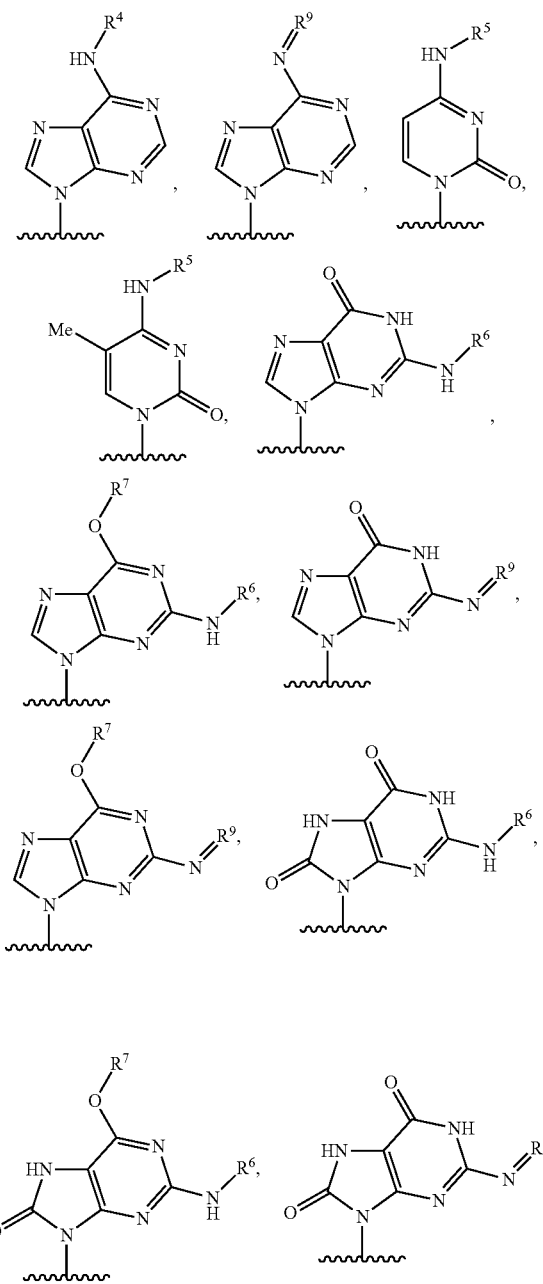

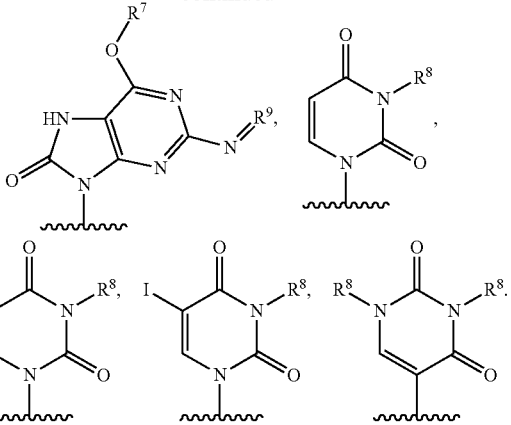

(wherein
- $R^4$ represents a hydrogen atom, a methyl group, a phenoxyacetyl group, a 4-tert-butylphenoxyacetyl group, a 4-isopropylphenoxyacetyl group, a phenylacetyl group, an acetyl group, or a benzoyl group,
- $R^5$ represents a hydrogen atom, an acetyl group, an isobutyryl group, or a benzoyl group,
- $R^6$ represents a hydrogen atom, a phenoxyacetyl group, a 4-tert-butylphenoxyacetyl group, a 4-isoproylphenoxyacetyl group, a phenylacetyl group, an acetyl group or an isobutyryl group,
- $R^7$ represents a 2-cyanoethyl group,
- $R^8$ represents a hydrogen atom, a methyl group, a benzoyl group, a 4-methoxybenzoyl group, or a 4-methylbenzoyl group, and
- $R^9$ represents a dimethylaminomethylene group.)

As for $G^1$, it can be used without any particularly limitation as long as it can function as a protecting group, and a publicly known protecting group used for the amidite compound can be widely used.

$G^1$ is, preferably, the following group.

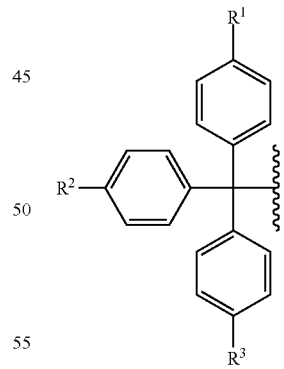

(wherein $R^1$, $R^2$ and $R^3$ are identical to or different from each other, and each independently represents a hydrogen atom or an alkoxy group.)

One of $R^1$, $R^2$ and $R^3$ is a hydrogen atom, and the remaining two thereof are identical to or different from each other (preferably identical) and represents preferably an alkoxy group, and as the alkoxy group, a methoxy group is particularly preferred.

As for $G^2$, it can be used without any particular limitation as long as it can function as a protecting group, and a publicly known protecting group used for an amidite compound can be widely used. Examples of $G^2$ include an alkyl group, an alkenyl group, an alkynyl group, a cycloalkyl group, a haloalkyl group, an aryl group, a heteroaryl group, an arylalkyl group, a cycloalkenyl group, a cycloalkylalkyl group, a cyclylalkyl group, a hydroxyalkyl group, an aminoalkyl group, an alkoxyalkyl group, a heterocyclylalkenyl group, a heterocyclylalkyl group, a heteroarylalkyl group, a silyl group, a silyloxyalkyl group, a mono, di or tri-alkylsilyl group, a mono, di or tri-alkylsilyloxyalkyl group, and the others, and these groups may be optionally substituted with one or more electron-withdrawing group.

$G^2$ is preferably an alkyl group substituted with an electron-withdrawing group. Examples of the electron-withdrawing group include a cyano group, a nitro group, an alkylsulfonyl group, a halogen atom, an arylsulfonyl group, a trihalomethyl group, a trialkylamino group, and the others, and preferably a cyano group.

Particularly preferable example of $G^2$ include the following group.

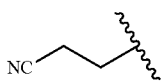 [SMILES: *CCC#N]

For $G^3$, two $G^3$ may be combined with each other to form a cyclic structure. Preferably, both $G^3$ are an isopropyl group.

The alkyl group as the definitions of the above $R^1$, $R^2$, $R^3$ and $G^2$ may be a straight chain or a branched chain, and preferably include an alkyl group containing 1 to 12 carbon atoms, and more preferably an alkyl group containing 1 to 6 carbon atoms. Specific examples of the alkyl group include methyl, ethyl, n-propyl, isopropyl, n-butyl, isobutyl, tert-butyl, n-pentyl, isopentyl, hexyl and the others. An alkyl group part which constitutes the alkoxy group in the definition for above substituents has the same definition as that described in the definition of the alkyl group described here.

As used herein, a nucleobase represents a group having a natural type or a non-natural type of nucleobase backbone. The above nucleobase also encompasses modified forms in which the natural type or the non-natural type of nucleobase backbone is modified. As a nucleobase represented by $B^C$, more specifically, the following structures are exemplified.

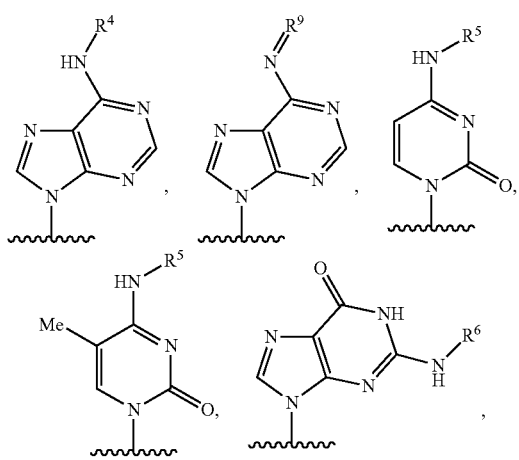

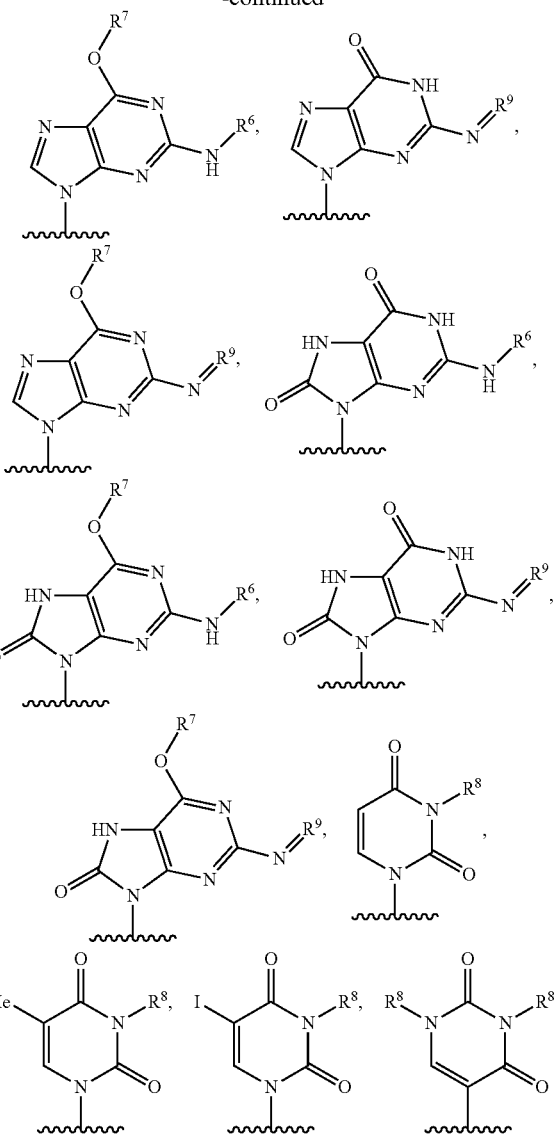

(wherein $R^{4'}$ represents a hydrogen atom, or a methyl group, $R^{5'}$ represents a hydrogen atom, or an acetyl group, $R^{6'}$ represents a hydrogen atom, $R^{8'}$ represents a hydrogen atom, or a methyl group.)

A non-nucleotide linker, which may be incorporated instead of the p nucleotides (with the proviso that p is a positive integer satisfying the equation: m−1>p) between the nucleotides at the 5' terminal and the 3' terminal, is explained.

As a non-nucleotide linker, a linker composed of amino acid backbone (for example, a linker composed of amino acid backbone as described in JP 5157168 B2 or JP 5554881 B2) is exemplified. Specifically, as a non-limiting example, a linker represented by the following formula (A14-1), (A14-2) or (A14-3) (for example, as described in JP 5555346 B2 or JP 5876890 B2) is exemplified. In addition to these linkers, particular linkers as described in WO 2012/005368 A1, WO 2018/182008 or WO 2019/074110 is exemplified.

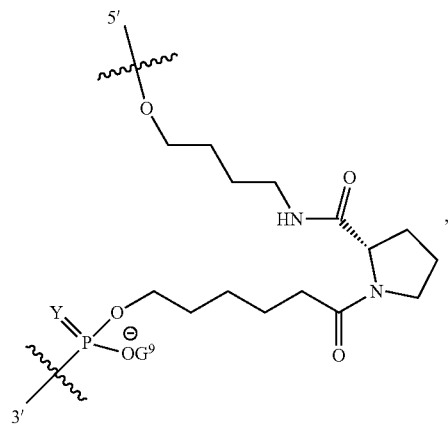

(A14-1)

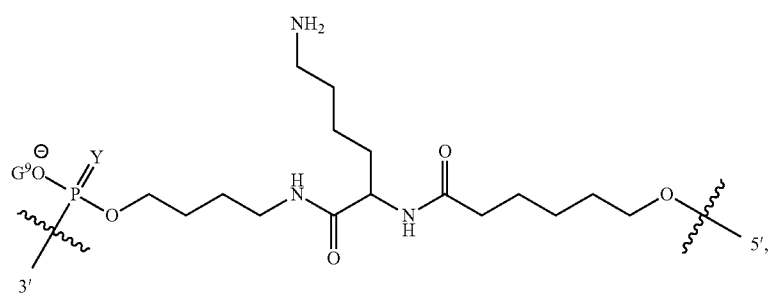

(A14-2)

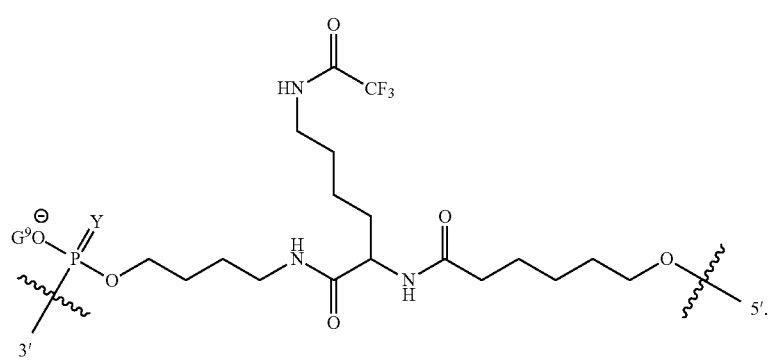

(A14-3)

A nucleotide and an amidite wherein an R group in formula (3) and an R' group in formula (4) are substituents other than a hydroxy group, can also be produced from nucleosides which are synthesized according to publicly known methods described in JP 3745226 B2 and on the others, or WO 2001/053528 A1, JP 2014-221817 A or publicly known methods referred to in these documents. Further, they can be produced by using a commercially available compound in line with the method described in the below Examples or according to methods with appropriate modifications to these methods.

Cleavage of a Nucleic Acid Oligomer (Hereinafter, Referred to as "Oligonucleotide") from a Solid Support The cleavage step was conducted by using concentrated aqueous ammonia as a cleavage agent on a nucleic acid oligomer having a desirable chain length.

In the phosphoramidite method, the nucleic acid elongation reaction is conducted by repeating each step such as the deprotection step, the coupling step and the oxidation step according to a generally known method (for example, the method described in the above JP 5157168 B2 or JP 5554881 B2).

(Nucleic Acid Elongation Reaction)

As used herein, "nucleic acid elongation reaction" refers to the reaction of elongating oligonucleotide by attaching nucleotides sequentially via phosphodiester bond. The nucleic acid elongation reaction can be carried out according to the procedures of general phosphoramidite method. The nucleic acid elongation reaction may be carried out with a nucleic acid automatic synthesizer and the others which applies the phosphoramidite method.

The chain length of a nucleic acid oligomer may be, for example, 2 to 200 mer, 10 to 150 mer, and 15 to 110 mer.

The 5' deprotection step is a step of deprotecting a protecting group of the 5' hydroxyl group at the RNA chain terminal which is supported on the solid support. As a general protecting group, a 4,4'-dimethoxytrityl group (DMTr group), a 4-monomethoxytrityl group, and a 4,4',4''-trimethoxytrityl group are used. The deprotection reaction can be carried out by using an acid. Examples of the acid for the deprotection reaction include trifluoroacetic acid, dichloroacetic acid, trifluoromethanesulfonic acid, trichloroacetic acid, methanesulfonic acid, hydrochloric acid, acetic acid, p-toluenesulfonic acid, and the others.

The coupling step is a reaction where a nucleoside phosphoramidite represented by formula (A13) is attached to the 5' hydroxyl group at the oligonucleotide chain terminal deprotected in the above deprotection step. As the phosphoramidite to be used in the nucleic acid elongation, an amidite compound represented by formula (A13) or (A12) is used. Additionally, as other available phosphoramidites, 2'-OMe, 2'-F, 2'-O-tert-butyldimetylsilyl group, 2'-O-methoxyethyl group, 2'-H, 2'-fluro-2'-deoxy-β-D-arabinofuranosyl and the others are included. As the above nucleoside phosphoramidite, those where 5' hydroxyl group is protected with a protecting group (for example, DMTr group) are used. The coupling step can be carried out by using an activator which activates the above-mentioned nucleoside phosphoramidite. Examples of the activator include 5-(benzylthio)-1H-tetrazole (BTT), 1H-tetrazole, 4,5-dicyanoimidazole (DCI), 5-(ethylthio)-1H-tetrazole (ETT), N-methyl benzimidazoliumtriflate (N-MeBIT), benzimidazoliumtriflate (BIT), N-phenylimidazoliumtriflate (N-PhIMT), imidazoliumtriflate (IMT), 5-nitrobenzimidazoliumtriflate (NBT), 1-hydroxybenzotriazole (HOBT), 5-(bis-3,5-trifluoromethylphenyl)-1H-tetrazole, and the others.

After the coupling step, as needed, the unreacted 5' hydroxyl group may be capped. The capping can be carried out by using publicly known capping solution such as acetic anhydride-tetrahydrofuran solution, phenoxyacetic anhydride/N-methylimidazole solution, and the others.

The oxidation step is a step of converting a phosphite group which is formed in the above coupling step into a phosphate group or a thiophosphate group. This step is a reaction of converting a trivalent phosphorus into a pentavalent phosphorus using an oxidizing agent, which can be carried out by reacting an oxidizing agent with oligonucleic acid derivatives supported on a solid support.

When a phosphite group is converted into a phosphate group, as "oxidizing agent", for example, iodine, aperacid such as tert-butyl hydroperoxide and hydrogen peroxide, or (1S)-(+)-(10-camphor sulfonyl)-oxazolidine (CSO), a mixture of two or more of these compounds can be used. The oxidizing agent can be used by diluting it with an appropriate solvent so as to adjust to 0.005 to 2 M concentration. The solvents to be used in the reaction are not particularly limited as long as they do not involve the reaction, and include pyridine, THF, water, acetonitrile, or any mixed solvents of two or more of these solvents. For example, iodine/water/pyridine/acetonitrile, or iodine/water/pyridine, or iodine/water/pyridine/acetonitrile/NMI, or iodine/water/pyridine/THF, or iodine/water/pyridine/THF/NMI, or CSO/acetonitrile, or iodine/pyridine-acetic acid, or peracid (tert-butyl hydroperoxide/methylene chloride) can be used.

When a phosphite group is converted into a thiophosphate group, as "oxidizing agent", for example, sulfur, 3H-1,2-benzodithiol-3-one-1,1-dioxide (Beaucage reagent), 3-amino-1,2,4-dithiazole-5-thione (ADTT), 5-phenyl-3H-1,2,4-dithiazole-3-one (POS), [(N,N-dimethylaminomethylidene)amino]-3H-1,2,4-dithiazoline-3-thione (DDTT), and phenylacetyldisulfide (PADS) can be also used. The oxidizing agent can be used by diluting it with an appropriate solvent so as to adjust to 0.01 to 2 M concentration. The solvents to be used in the reaction are not particularly limited as long as they do not involve the reaction, and include, for example, dichloromethane, acetonitrile, pyridine, or any mixed solvents of these solvents. The oxidation step may be carried out after the above-mentioned capping procedure, or vice versa, the capping procedure may be carried after the oxidation step, and the order of the procedures are not limited.

In the step of deprotecting a protecting group of a phosphorus group, after the synthesis of a nucleic acid having a desirable sequence is completed, an amine compound is reacted to deprotect a protecting group of a phosphorus part. Examples of the amine compound include, for example, diethylamine and the others as described in JP 4705716 B2.

The protecting group of 5' hydroxyl group of a nucleoside incorporated in the last stage of the elongation may be used for the column purification with 5' protecting group as a tag after the below-mentioned procedures of cleaving from a solid support and deprotecting of a protecting group, or alternatively, the protecting group of 5' hydroxyl group may be deprotected after the column purification.

Further, using an aqueous ammonia or an amine compound or the others, for example, an oligonucleotide chain is collected by cleaving from a solid support as shown in the above Scheme 2. Examples of the amine compound include methylamine, ethylamine, propylamine, isopropylamine, ethylenediamine, diethylamine, and the others.

Examples of the nucleic acid oligomer which can be produced according to the production method of the embodiments as described herein include those wherein a nucleoside contained in the nucleic acid oligomer is RNA, DNA, RNA containing 2'-O-MOE, 2'-O-Me, or 2'-F, and LNA, which is not limited thereto.

For example, various nucleosides described in Xiulong, Shen et al., Nucleic Acids Research, 2018, Vol. 46, No. 46, 1584-1600, and Daniel O'Reilly et al., Nucleic Acids Research, 2019, Vol. 47, No. 2, 546-558 are included.

As typical examples of nucleic acid oligomers which can be used in the production method of the embodiments as described herein, the following examples are indicated in addition to examples described in working examples, which are not limited thereto.

Hereinafter, in a description of a sequence, U represents uridine, C represents cytidine, A represents adenosine, and G represents guanosine.

Nucleic acid oligomers having the following sequences (B) and (C) as described in WO 2019/060442 are exemplified.

```
Sequence (B):
                            (Sequence No. 3)
5'-AUGGAAUmACUCUUGGUUmACdTdT-3'
(Antisense)
21 mer Sequence (C):
                            (Sequence No. 4)
5'-GUmAACmCmAAGAGUmAUmUmCmCmAUmdTdT-3'
(Sense) 21 mer
```

In the sequence (B) and sequence (C), Um represents 2'-O-metyluridine, Cm represents 2'-O-methylcytidine, and dT represents thymidine.

A nucleic acid oligomer as described in Daniel O'Reilly et al., Nucleic Acids Research, 2019, Vol. 47, No. 2, 546-558 (refer to p. 553) is exemplified. Typical examples thereof include a nucleic acid oligomer having the following sequence (D).

Sequence (D):
(Sequence No. 5)
5'-AGAGCCAGCCUUCUUAUUGUUUUAGAGCUAUGCUGU-3'
36 mer Nucleic acid oligomers as described in JP 4965745 B2 are exemplified. Typical examples thereof include a nucleic acid oligomer having the following sequence (E).

Sequence (E):
5'-CCAUGAGAAGUAUGACAACAGCC-P-GGCUGUUGUCAUA

CUUCUCAUGGUU-3'
49 mer.

(Sequence No. 6)
CCAUGAGAAGUAUGACAACAGCC, (Sequence No. 7)
GGCUGUUGUCAUACUUCUCAUGGUU.

In the Sequence (E), "P" is depicted by a partial structure separated by wavy lines in the following formula (A5).

A nucleic acid oligomer having the following sequence (F) as described in Nucleic Acids Research, 2019, Vol. 47, No. 2: 547 is exemplified.

Sequence (F):
(Sequence No. 8)
5'-ACAGCAUAGCAAGUUAAAAUAAGGCUAGUCCGUUAUCAACUU

GAAAAAGUGGCACCGAGUCGGUGCU-3'
67 mer

A nucleic acid oligomer having the following sequence (G) as described in JP 2015-523856, p. 173 is exemplified.

Sequence (G):
(Sequence No. 9)
5'-GUUUUCCCUUUUCAAAGAAAUCUCCUGGGCACCUAUCUUCUU

AGGUGCCCUCCCUUGUUUAAACCUGACCAGUUAACCGGCUGGUUA

GGUUUUU-3'
94 mer

Nucleic acid oligomers as described in JP 2017-537626 are exemplified. Typical examples thereof include nucleic acid oligomers having the following sequences (H), (J), (K), and (L).

Sequence (H):
(Sequence No. 10)
5'-AGUCCUCAUCUCCCUCAAGCGUUUUAGAGCUAGUAAUAGCAA

GUUAAAAUAAGGCUAGUCCGUUAUCAACUUGAAAAAGUGGCACCG

AGUCGGUGCUUUU-3'
100 mer

Sequence (J):
(Sequence No. 11)
5'-GCAGAUGUAGUGUUUCCACAGUUUAAGAGCUAUGCUGGAAAC

AGCAUAGCAAGUUAAAUAAGGCUAGUCCGUUAUCAACUUGAAAA

AGUGGCACCGAGUCGGUGCUUUUUUU-3'
113 mer

Sequence (K):
(Sequence No. 12)
5'-dAdGdTdCdCdTdCdAdTdCdTdCdCdCdTdCdAdAdGdCGU

UUAAGAGCUAUGCUGGUAACAGCAUAGCAAGUUUAAAUAAGGCUA

GUCCGUUAUCAACUUGAAAAAGUGGCACCGAGUCGGUGCUUUUUU
U-3'
113 mer

In the sequence (K), dT represents thymidine, dC represents 2'-deoxycytidine, dA represents 2'-deoxyadenosine, and dG represents 2'-deoxyguanosine.

Sequence (L):
5'-AmsGmsUmsCCUCAUCUCCCUCAAGCGUUUAAGAGCUAUGCU

GGUAACAGCAUAGCAAGUUUAAAUAAGGCUAGUCCGUUAUCAACU

UGAAAAAGUGGCACCGAGUCGGUGCUUUUmsUmsUmsU-3'
(Sequence 13)
113 mer

In the Sequence (L), Um represents 2'-O-methyluridine, Am represents 2'-O-methyladenosine, Gm represents 2'-O-methylguanosine, or s represents phosphorothioate modification.

EXAMPLES

Hereinafter, the present invention is explained in more detail by working examples, but the present invention is not limited to these examples.

<Measurement Method>

Various measurement methods used in the following tests are shown below.

(Measurement Method 1: Measurement of the Purity of the Oligonucleotide)

The measurement of the purity of the crude product of oligonucleotide after solid-phase synthesis was conducted by HPLC. The crude product was separated into each component by HPLC (wavelength 260 nm, column ACQUITY UPLC Oligonucleotide BEH C18, 2.1 mm×100 mm, 1.7 μm (manufactured by Waters)), and the purity of the oligonucleotide was calculated from the area value of the main product in the total area value of the obtained chromatogram.

The HPLC measurement conditions are shown in Table 1 below.

TABLE 1

| | |
|---|---|
| Column | ACQUITY UPLC Oligonucleotide BEH C18, 2.1 mm × 100 mm, 1.7 μm(Manufactured by Waters) |
| Flow rate | 0.2 mL/min |
| Detection wavelength | 260 nm |
| Mobile phase A | a solution prepared by mixing 100 mL of a solution (prepared by mixing 458.3 g of water, 15.0 g of acetic acid, and 25.3 g of hexylamine) with 400 mL of water |
| Mobile phase B | a solution prepared by mixing 100 mL of a solution (prepared by mixing 458.3 g of water, 15.0 g of acetic acid, and 25.3 g of hexylamine) with 400 mL of acetonitrile |
| Gradient condition | B conc.: 43%(0 min) −56%(70 min) −90%(70.01 min) −90%(75 min) −43%(75.01 min) −43%(90 min) |
| Column temperature | 80° C. |

(Measurement Method 2: Measurement of the Yield of the Oligonucleotide)

$OD_{260}$ of the above crude product was measured. $OD_{260}$ represents an absorbance at UV260 nm per 10 mm optical path length in a 1 mL solution (pH=7.5). Since it is generally known that 1 OD=40 μg for RNA, the yield was calculated based on the above measured value of $OD_{260}$. Further, the yield of the products per unit volume of solid support was calculated. For the Examples 1 to 21, each relative yield to the yield of Comparative Example 1 was calculated. For the Examples 22 to 23, each relative yield to the yield of Comparative Example 2 was calculated.

Solid-Phase Synthesis of Oligonucleotides

```
Sequence (I):
5'-AGCAGAGUACACACAGCAUAUACC-P-GGUAUAUGCUGUGUG
UACUCUGCUUC-P-G-3'
53 mer
```

In the above sequence (I), "A" is represented by a partial structure separated by wavy lines in the following formula (A1). "C" is represented by a partial structure separated by wavy lines in the following formula (A2). "G" is represented by a partial structure separated by wavy lines in the following formula (A3). "U" is represented by a partial structure separated by wavy lines in the following formula (A4). "P" is represented by a partial structure separated by wavy lines in the following formula (A5). Here "A" at the 5' terminal is represented by a partial structure separated by wavy lines in the following formula (A6). Also "G" at the 3' terminal is represented by a partial structure separated by wavy lines in the following formula (A7). Here the phosphoric acid in a structural formula may be its salt.

In other words, the sequence (I) consists of AGCAGAGUAC ACACAGCAUA UACC (Sequence No. 1) and GGUAUAUGCU GUGUGUACUC UGCUUC (Sequence No. 2), which are bounded to each other by the above "P".

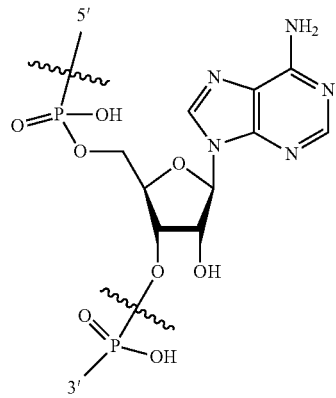
(A1)

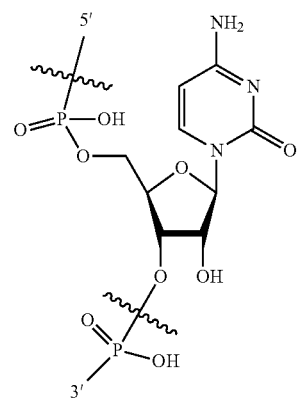
(A2)

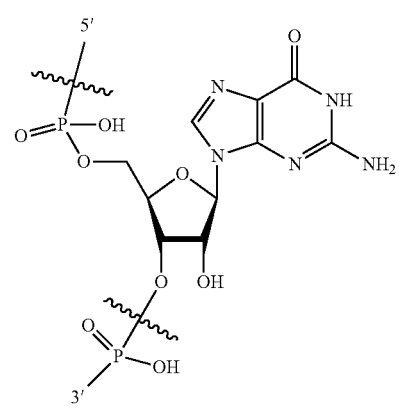
(A3)

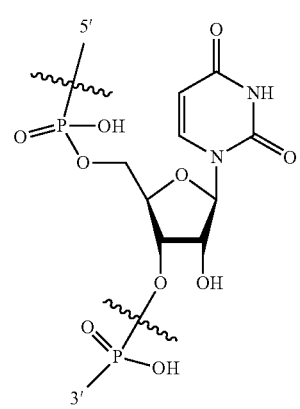
(A4)

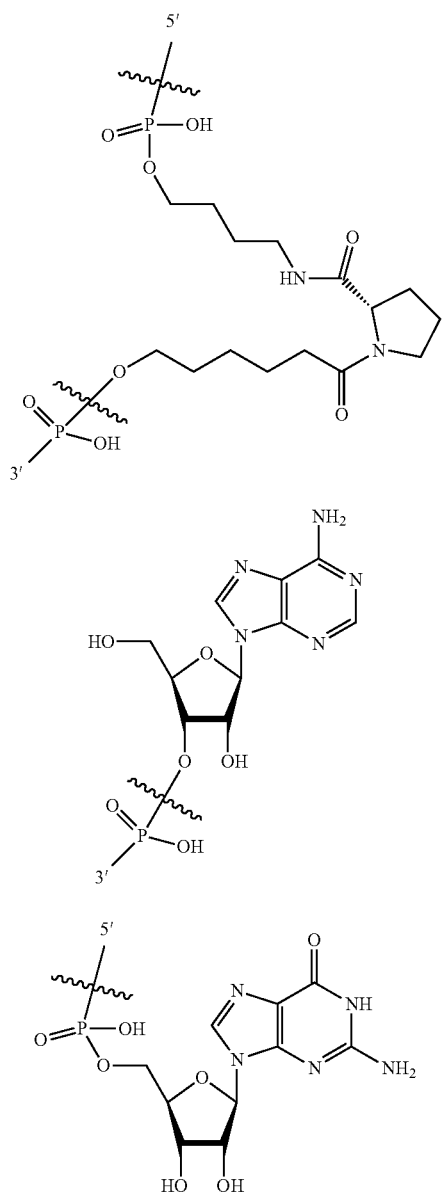

(A5)

(A6)

(A7)

Using Controlled Pore Glass (CPG) as a solid support and an AKTA oligopilot plus 100 (manufactured by GE healthcare) as a nucleic acid synthesizer, according to the phosphoramidite solid-phase synthesis method, an oligonucleotide composed by the above sequence (I) was synthesized from the 3' side to the 5' side. The synthesis was carried out on a scale of 77.89 μmol. In addition, in the synthesis, uridine EMM amidite (Compound (A11)) (as described in the working Example 2 of WO 2013/027843), cytidine EMM amidite (Compound (A9)) (as described in the working Example 3), adenosine EMM amidite (Compound (A8)) (as described in the working Example 4), guanosine EMM amidite (Compound (A10)) (as described in the working Example 5), Compound (A12) (as described in WO 2017/188042), $N^6$-acetyl-5'-O-(4,4'-dimethoxytrityl)-2'-O-(2-cyanoethoxymethyl)adenosine 3'-O-(2-cyanoethyl N,N-diisopropyl phosphoramidite (Compound (A15) (as described in the working Example 9 of JP 5157168 B), $N^2$-acetyl-5'-O-(4,4'-dimethoxytrityl)-2'-O-(2-cyanoethoxymethyl)guanosine 3'-O-(2-cyanoethyl N,N-diisopropyl phosphoramidite (Compound (A17) (as described in the working Example 8 thereof), $N^4$-acetyl-5'-O-(4,4'-dimethoxytrityl)-2'-O-(2-cyanoethoxymethyl)cytidine 3'-O-(2-cyanoethyl N,N-diisopropyl phosphoramidite (Compound (A16) (as described in the working Example 5 thereof), and 5'-O-(4,4'-dimethoxytrityl)-2'-O-(2-cyanoethoxymethyl)uridine 3'-O-(2-cyanoethyl N,N-diisopropyl phosphoramidite (A18) (as described in the working Example 2 thereof) were used, and a solution of trichloro acetic acid in toluene was used as a deblocking solution, and 5-benzylmercapto-1H-tetrazole was used as a coupling agent, and an iodine solution was used as an oxidizing agent, and a phenoxy acetic anhydride solution and a N-methyl imidazole solution were used as a capping solution. After a completion of a nucleic acid elongation, a diethylamine solution was acted to a nucleic acid on a support so as to deprotect selectively a cyanoethyl protecting group in a phosphoric acid part.

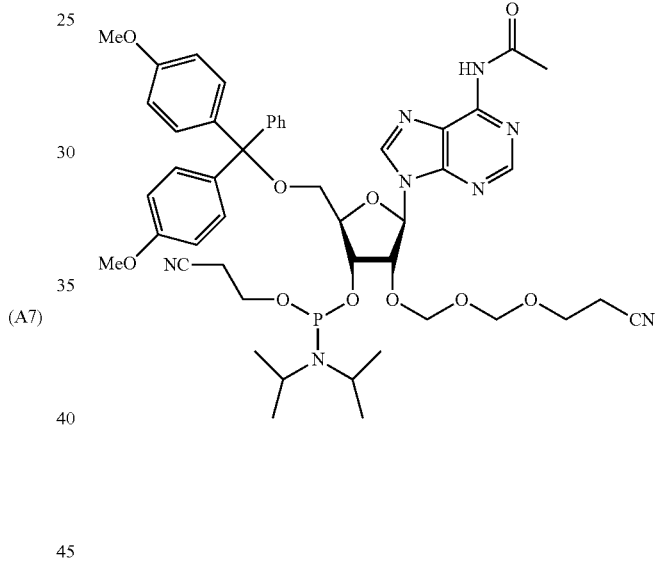

(A8)

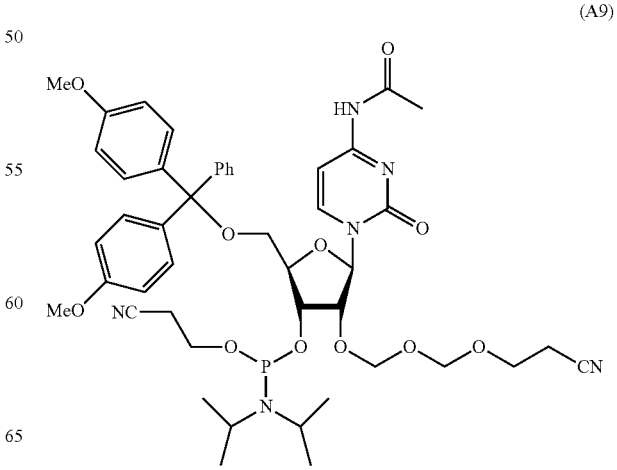

(A9)

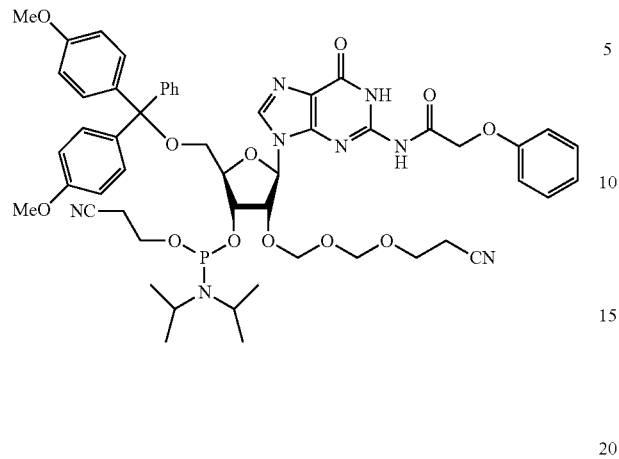
(A10)
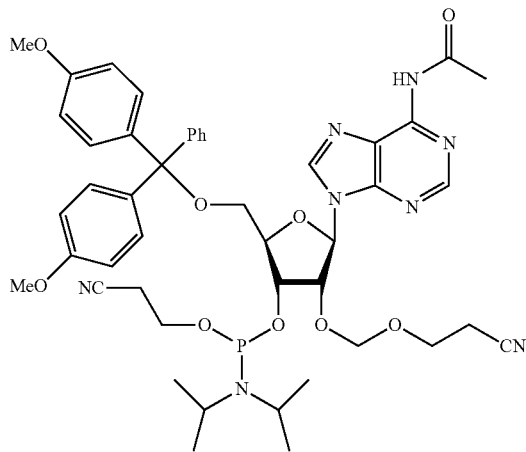
(A15)
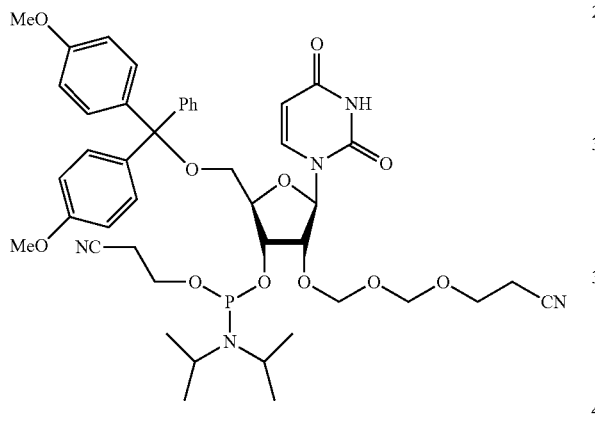
(A11)
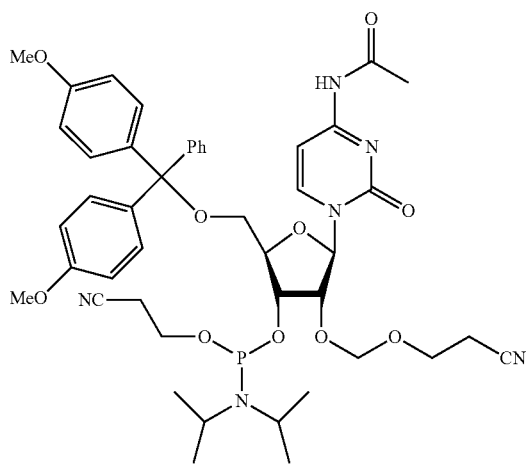
(A16)
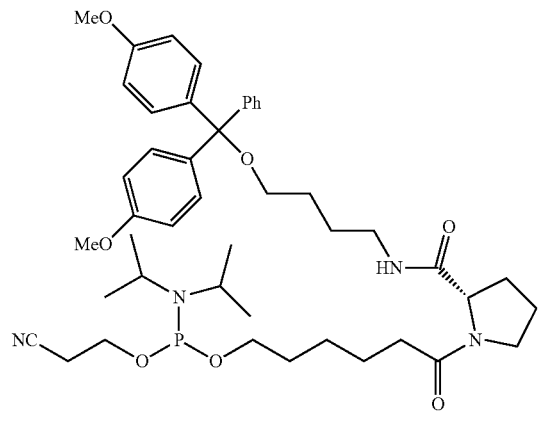
(A12)
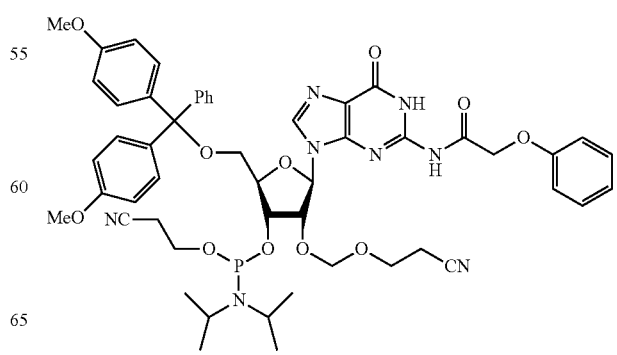
(A17)

-continued (A18)

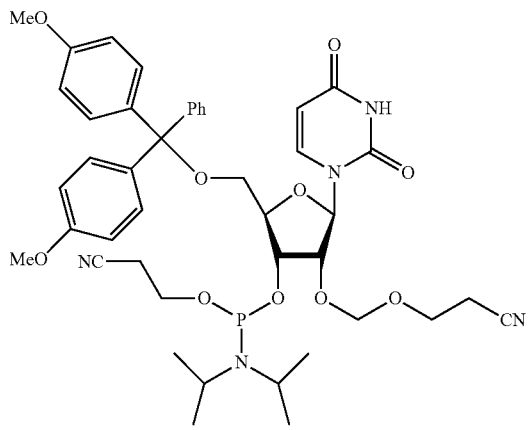

Next, specific production examples of oligonucleotides (nucleic acid oligomers) produced by the production method of the present embodiments are shown. The reaction was conducted under air (oxygen concentration 21%). Here, in the following examples, the oligonucleotides produced by the production method of the present embodiments are oligonucleotides having sequence (I) shown by sequence Nos. 1 and 2.

In addition, the guanosine derivatives as described in the following Examples and Comparative Examples represent the compounds represented by the following structural formula. A circle as depicted in the following structural formula represents CPG schematically.

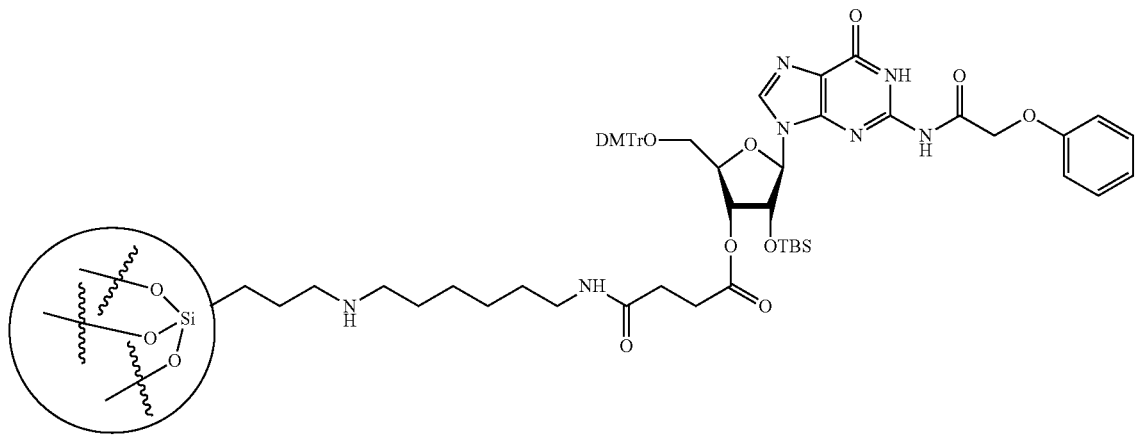

Example 1

Using CPG on which 93.79 μmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 μmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.504 μmol parts of the resulting solution was collected in a falcon tube having a volume of 15 mL. 2,6-Di-tert-butyl-p-cresol (BHT) 0.73 mg was added thereto (the amount of BHT was 0.1 mol per 1 mol of a protecting group), and was solubilized, and 1M tetra-n-butylammonium fluoride (TBAF) in dimethyl sulfoxide solution 0.75 g (which was dehydrated with molecular sieve 4 A) (the amount of TBAF was 27.1 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyano-ethoxymethoxy (CEM) protecting group. The crude product was obtained by a precipitation procedure. The yield was 4.4 mg, and the purity was 52%. As for the obtained crude product, the purity of the oligonucleotide was measured according to the method described in the above measurement method 1, and the yield of the oligonucleotide was measured according to the method described in the above measurement method 2.

Example 2

Using CPG on which 93.79 μmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 μmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.504 μmol parts of the resulting solution was collected in a falcon tube having a volume of 15 mL. 2,6-Di-tert-butyl-p-cresol (BHT) 2.85 mg was added thereto (the amount of BHT was 0.5 mol per 1 mol of a protecting group), and was solubilized, and 1M tetra-n-butylammonium fluoride (TBAF) in dimethyl sulfoxide solution 0.75 g (which was dehydrated with molecular sieve 4 A) (the amount of TBAF was 27.1 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.2 mg, and the purity was 53%. As for the obtained crude product, the purity of the oligonucleotide was measured according to the method described in the above measurement method 1, and the yield of the oligonucleotide was measured according to the method described in the above measurement method 2.

Example 3

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.503 µmol parts of the resulting solution was collected in a falcon tube having a volume of 15 mL. 2,6-Di-tert-butyl-p-cresol (BHT) 5.83 mg was added thereto (the amount of BHT was 1.0 mol per 1 mol of a protecting group), and was solubilized, and 1M tetra-n-butylammonium fluoride (TBAF) in dimethyl sulfoxide solution 0.75 g (which was dehydrated with molecular sieve 4 A) (the amount of TBAF was 27.2 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.2 mg, and the purity was 53%. As for the obtained crude product, the purity of the oligonucleotide was measured according to the method described in the above measurement method 1, and the yield of the oligonucleotide was measured according to the method described in the above measurement method 2.

Example 4

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.489 µmol parts of the resulting solution was collected in a falcon tube having a volume of 15 mL. 2,6-Di-tert-butyl-p-cresol (BHT) 11.56 mg was added thereto (the amount of BHT was 2.1 mol per 1 mol of a protecting group), and was solubilized, and 1M tetra-n-butylammonium fluoride (TBAF) in dimethyl sulfoxide solution 0.75 g (which was dehydrated with molecular sieve 4 A) (the amount of TBAF was 28.0 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.0 mg, and the purity was 53%. As for the obtained crude product, the purity of the oligonucleotide was measured according to the method described in the above measurement method 1, and the yield of the oligonucleotide was measured according to the method described in the above measurement method 2.

Example 5

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.512 µmol parts of the resulting solution was collected in a falcon tube having a volume of 15 mL. 2,6-Di-tert-butyl-p-cresol (BHT) 17.81 mg was added thereto (the amount of BHT was 3.0 mol per 1 mol of a protecting group), and was solubilized, and 1M tetra-n-butylammonium fluoride (TBAF) in dimethyl sulfoxide solution 0.79 g (which was dehydrated with molecular sieve 4 A) (the amount of TBAF was 28.1 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.2 mg, and the purity was 52%. As for the obtained crude product, the purity of the oligonucleotide was measured according to the method described in the above measurement method 1, and the yield of the oligonucleotide was measured according to the method described in the above measurement method 2.

Example 6

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.510 μmol parts of the resulting solution was collected in a falcon tube having a volume of 15 mL. 2,6-Di-tert-butyl-p-cresol (BHT) 23.11 mg was added thereto (the amount of BHT was 4.0 mol per 1 mol of a protecting group), and was solubilized, and 1M tetra-n-butylammonium fluoride (TBAF) in dimethyl sulfoxide solution 0.76 g (which was dehydrated with molecular sieve 4 A) (the amount of TBAF was 27.2 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.2 mg, and the purity was 52%. As for the obtained crude product, the purity of the oligonucleotide was measured according to the method described in the above measurement method 1, and the yield of the oligonucleotide was measured according to the method described in the above measurement method 2.

Example 7

Using CPG on which 93.79 μmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 μmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.503 μmol parts of the resulting solution was collected in a falcon tube having a volume of 15 mL. 4-Sec-butyl-2,6-di-tert-butyl-phenol 7.20 mg was added thereto (the amount of 4-sec-butyl-2,6-di-tert-butyl-phenol was 1.0 mol per 1 mol of a protecting group), and was solubilized, and 1M tetra-n-butylammonium fluoride (TBAF) in dimethyl sulfoxide solution 0.75 g (which was dehydrated with molecular sieve 4 A) (the amount of TBAF was 27.2 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.2 mg, and the purity was 54%. As for the obtained crude product, the purity of the oligonucleotide was measured according to the method described in the above measurement method 1, and the yield of the oligonucleotide was measured according to the method described in the above measurement method 2.

Example 8

Using CPG on which 93.79 μmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 μmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.485 μmol parts of the resulting solution was collected in a falcon tube having a volume of 15 mL. 6-Tert-butyl-2,4-xylenol 4.20 mg was added thereto (the amount of 6-tert-butyl-2,4-xylenol was 0.9 mol per 1 mol of a protecting group), and was solubilized, and 1M tetra-n-butylammonium fluoride (TBAF) in dimethyl sulfoxide solution 0.76 g (which was dehydrated with molecular sieve 4 A) (the amount of TBAF was 28.6 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.1 mg, and the purity was 56%. As for the obtained crude product, the purity of the oligonucleotide was measured according to the method described in the above measurement method 1, and the yield of the oligonucleotide was measured according to the method described in the above measurement method 2.

Example 9

Using CPG on which 93.79 μmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 μmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.492 μmol parts of the resulting solution was collected in a falcon tube having a volume of 15 mL. 4,6-Di-tert-butyl-m-crezol 5.30 mg was added thereto (the amount of 4,6-di-tert-butyl-m-crezol was 0.9 mol per 1 mol of a protecting group), and was solubilized, and 1M tetra-n-butylammonium fluoride (TBAF) in dimethyl sulfoxide solution 0.77 g (which was dehydrated with molecular sieve 4 A) (the amount of TBAF was 28.5 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.4 mg, and the purity was 52%. As for the obtained crude product, the purity of the oligonucleotide was measured according to the method described in the above measurement method 1, and the yield of the oligonucleotide was measured according to the method described in the above measurement method 2.

Example 10

Using CPG on which 93.79 μmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.506 µmol parts of the resulting solution was collected in a falcon tube having a volume of 15 mL. 1,4-Dihydroxybenzene 3.00 mg was added thereto (the amount of 1,4-dihydroxybenzene was 1.0 mol per 1 mol of a protecting group), and was solubilized, and 1M tetra-n-butylammonium fluoride (TBAF) in dimethyl sulfoxide solution 0.75 g (which was dehydrated with molecular sieve 4 A) (the amount of TBAF was 27.0 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.3 mg, and the purity was 53%. As for the obtained crude product, the purity of the oligonucleotide was measured according to the method described in the above measurement method 1, and the yield of the oligonucleotide was measured according to the method described in the above measurement method 2.

Example 11

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.493 µmol parts of the resulting solution was collected in a falcon tube having a volume of 15 mL. Bis(2,2,6,6-tetramethyl-4-piperidyl)sebacate 1.30 mg was added thereto (the amount of bis(2,2,6,6-tetramethyl-4-piperidyl)sebacate was 0.1 mol per 1 mol of a protecting group), and was solubilized, and 1M tetra-n-butylammonium fluoride (TBAF) in dimethyl sulfoxide solution 0.79 g (which was dehydrated with molecular sieve 4 A) (the amount of TBAF was 29.2 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.3 mg, and the purity was 52%. As for the obtained crude product, the purity of the oligonucleotide was measured according to the method described in the above measurement method 1, and the yield of the oligonucleotide was measured according to the method described in the above measurement method 2.

Example 12

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.492 µmol parts of the resulting solution was collected in a falcon tube having a volume of 15 mL. Bis(2,2,6,6-tetramethyl-4-piperidyl)sebacate 6.40 mg was added thereto (the amount of bis(2,2,6,6-tetramethyl-4-piperidyl)sebacate was 0.5 mol per 1 mol of a protecting group), and was solubilized, and 1M tetra-n-butylammonium fluoride (TBAF) in dimethyl sulfoxide solution 0.76 g (which was dehydrated with molecular sieve 4 A) (the amount of TBAF was 28.2 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.3 mg, and the purity was 54%. As for the obtained crude product, the purity of the oligonucleotide was measured according to the method described in the above measurement method 1, and the yield of the oligonucleotide was measured according to the method described in the above measurement method 2.

Example 13

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.511 µmol parts of the resulting solution was collected in a falcon tube having a volume of 15 mL. 2,2,6,6-Tetramethyl-4-piperidyl methacrylate 0.66 mg was added thereto (the amount of 2,2,6,6-Tetramethyl-4-piperidyl methacrylate was 0.1 mol per 1 mol of a protecting group), and was solubilized, and 1M tetra-n-butylammonium fluoride (TBAF) in dimethyl sulfoxide solution 0.75 g (which was dehydrated with molecular sieve 4 A) (the amount of TBAF was 26.8 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.2 mg, and the purity was 52%. As for the obtained crude product, the purity of the oligonucleotide was measured according to the method described in the above measurement method 1, and the yield of the oligonucleotide was measured according to the method described in the above measurement method 2.

Example 14

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.499 µmol parts of the resulting solution was collected in a falcon tube having a volume of 15 mL. 2,2,6,6-Tetramethyl-4-piperidyl methacrylate 2.80 mg was added thereto (the amount of 2,2,6,6-Tetramethyl-4-piperidyl methacrylate was 0.5 mol per 1 mol of a protecting group), and was solubilized, and 1M tetra-n-butylammonium fluoride (TBAF) in dimethyl sulfoxide solution 0.79 g (which was dehydrated with molecular sieve 4 A) (the amount of TBAF was 28.9 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.0 mg, and the purity was 52%. As for the obtained crude product, the purity of the oligonucleotide was measured according to the method described in the above measurement method 1, and the yield of the oligonucleotide was measured according to the method described in the above measurement method 2.

Example 15

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.495 µmol parts of the resulting solution was collected in a falcon tube having a volume of 15 mL. 2,2,6,6-Tetramethyl-4-piperidyl methacrylate 6.50 mg was added thereto (the amount of 2,2,6,6-Tetramethyl-4-piperidyl methacrylate was 1.1 mol per 1 mol of a protecting group), and was solubilized, and 1M tetra-n-butylammonium fluoride (TBAF) in dimethyl sulfoxide solution 0.75 g (which was dehydrated with molecular sieve 4 A) (the amount of TBAF was 27.6 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.0 mg, and the purity was 52%. As for the obtained crude product, the purity of the oligonucleotide was measured according to the method described in the above measurement method 1, and the yield of the oligonucleotide was measured according to the method described in the above measurement method 2.

Example 16

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.508 µmol parts of the resulting solution was collected in a falcon tube having a volume of 15 mL. 2,2,6,6-Tetramethylpiperidine-1-oxyl free radical 4.9 mg was added thereto (the amount of 2,2,6,6-tetramethylpiperidine-1-oxyl free radical was 1.2 mol per 1 mol of a protecting group), and was solubilized, and 1M tetra-n-butylammonium fluoride (TBAF) in dimethyl sulfoxide solution 0.83 g (which was dehydrated with molecular sieve 4 A) (the amount of TBAF was 29.8 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.2 mg, and the purity was 55%. As for the obtained crude product, the purity of the oligonucleotide was measured according to the method described in the above measurement method 1, and the yield of the oligonucleotide was measured according to the method described in the above measurement method 2.

Example 17

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.485 µmol parts of the resulting solution was collected in a falcon tube having a volume of 15 mL. Dioctadecylsulfide 14.30 mg was added thereto (the amount of dioctadecylsulfide was 1.1 mol per 1 mol of a protecting group), and further dimethylsulfoxide 0.28 g was added, was solubilized, and 1M tetra-n-butylammonium fluoride (TBAF) in dimethyl sulfoxide solution 0.78 g (which was dehydrated with molecular sieve 4 A) (the amount of TBAF was 29.3 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.0 mg, and the purity was 55%. As for the obtained crude product, the purity of the oligonucleotide was measured according to the method described in the above measurement method 1, and the yield of the oligonucleotide was measured according to the method described in the above measurement method 2.

Example 18

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.489 µmol parts of the resulting solution was collected in a falcon tube having a volume of 15 mL. Benzophenone 5.00 mg was added thereto (the amount of benzophenone was 1.1 mol per 1 mol of a protecting group), was solubilized, and 1M tetra-n-butylammonium fluoride (TBAF) in dimethyl sulfoxide solution 0.79 g (which was dehydrated with molecular sieve 4 A) (the amount of TBAF was 29.5 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.2 mg, and the purity was 55%. As for the obtained crude product, the purity of the oligonucleotide was measured according to the method described in the above measurement method 1, and the yield of the oligonucleotide was measured according to the method described in the above measurement method 2.

Example 19

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.505 µmol parts of the resulting solution was collected in a falcon tube having a volume of 15 mL. n-Octanohydrazide 4.10 mg was added thereto (the amount of n-octanohydrazide was 1.0 mol per 1 mol of a protecting group), was solubilized, and 1M tetra-n-butylammonium fluoride (TBAF) in dimethyl sulfoxide solution 0.79 g (which was dehydrated with molecular sieve 4 A) (the amount of TBAF was 28.5 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.3 mg, and the purity was 54%. As for the obtained crude product, the purity of the oligonucleotide was measured according to the method described in the above measurement method 1, and the yield of the oligonucleotide was measured according to the method described in the above measurement method 2.

Example 20

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.500 µmol parts of the resulting solution was collected in a falcon tube having a volume of 15 mL. Succinic dihydrazide 3.90 mg was added thereto (the amount of succinic dihydrazide was 1.0 mol per 1 mol of a protecting group), was solubilized, and 1M tetra-n-butylammonium fluoride (TBAF) in dimethyl sulfoxide solution 0.81 g (which was dehydrated with molecular sieve 4 A) (the amount of TBAF was 29.6 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.1 mg, and the purity was 52%. As for the obtained crude product, the purity of the oligonucleotide was measured according to the method described in the above measurement method 1, and the yield of the oligonucleotide was measured according to the method described in the above measurement method 2.

Example 21

Using CPG on which 93.79 µmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 µmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.494 μmol parts of the resulting solution was collected in a falcon tube having a volume of 15 mL. Triphenylphosphine 6.00 mg was added thereto (the amount of succinic dihydrazide was 0.9 mol per 1 mol of a protecting group), was solubilized, and 1M tetra-n-butylammonium fluoride (TBAF) in dimethyl sulfoxide solution 0.79 g (which was dehydrated with molecular sieve 4 A) (the amount of TBAF was 29.2 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.3 mg, and the purity was 54%. As for the obtained crude product, the purity of the oligonucleotide was measured according to the method described in the above measurement method 1, and the yield of the oligonucleotide was measured according to the method described in the above measurement method 2.

Comparative Example 1

Using CPG on which 93.79 μmol of guanosine derivative was supported, and each amidite represented by formula (A15), formula (A16), formula (A17), formula (A18), or formula (A12) respectively, solid-phase synthesis of sequence (I) was carried out by an AKTA oligopilot plus 100. Thereafter, the CPG support on which 30.03 μmol of the oligonucleotide was supported was collected, and the oligonucleotide was released from the solid support using aqueous ammonia 10.15 g and ethanol 3.07 g, and the support was filtered off, and the filtrate containing the released oligonucleotide was concentrated to dryness. Next, the released oligonucleotide was solubilized in 13.24 g of dimethyl sulfoxide, and thereto were added nitromethane 0.46 g and acetonitrile 2.99 g, and 0.498 μmol parts of the resulting solution was collected in a falcon tube having a volume of 15 mL. 1M tetra-n-butylammonium fluoride (TBAF) in dimethyl sulfoxide solution 0.78 g (which was dehydrated with molecular sieve 4 A) (the amount of TBAF was 28.6 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-cyanoethoxymethoxy (CEM) protecting group. The crude product was obtained by a precipitation procedure. The yield was 4.1 mg, and the purity was 48%. As for the obtained crude product, the purity of the oligonucleotide was measured according to the method described in the above measurement method 1, and the yield of the oligonucleotide was measured according to the method described in the above measurement method 2.

Example 22

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.504 μmol parts of the resulting solution was collected in a falcon tube having a volume of 15 mL. Nitromethane 2.89 mg and 2,6-di-tert-butyl-p-cresol (BHT) 1.15 mg were added thereto (the amount of BHT was 0.2 mol per 1 mol of a protecting group), and was solubilized, and 1M tetra-n-butylammonium fluoride (TBAF) in dimethyl sulfoxide solution 0.78 g (which was dehydrated with molecular sieve 4 A) (the amount of TBAF was 28.2 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. The crude product was obtained by a precipitation procedure. The yield was 4.2 mg, and the purity was 53%. As for the obtained crude product, the purity of the oligonucleotide was measured according to the method described in the above measurement method 1, and the yield of the oligonucleotide was measured according to the method described in the above measurement method 2.

Example 23

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.513 μmol parts of the resulting solution was collected in a falcon tube having a volume of 15 mL. Nitromethane 2.89 mg and 2,6-di-tert-butyl-p-cresol (BHT) 5.87 mg were added thereto (the amount of BHT was 1.0 mol per 1 mol of a protecting group), and was solubilized, and 1M tetra-n-butylammonium fluoride (TBAF) in dimethyl sulfoxide solution 0.78 g (which was dehydrated with molecular sieve 4 A) (the amount of TBAF was 27.7 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group.

Any protecting groups were deprotected. The crude product was obtained by a precipitation procedure. The yield was 4.0 mg, and the purity was 53%. As for the obtained crude product, the purity of the oligonucleotide was measured according to the method described in the above measurement method 1, and the yield of the oligonucleotide was measured according to the method described in the above measurement method 2.

Example 24

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.511 μmol parts of the resulting solution was collected in a falcon tube having a volume of 15 mL. Nitromethane 2.89 mg and 2,6-di-tert-butyl-p-cresol (BHT) 23.20 mg were added thereto (the amount of BHT was 4.0 mol per 1 mol of a protecting group), and was solubilized, and 1M tetra-n-butylammonium fluoride (TBAF) in dimethyl sulfoxide solution 0.78 g (which was dehydrated with molecular sieve 4 A) (the amount of TBAF was 27.8 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.3 mg, and the purity was 55%. As for the obtained crude product, the purity of the oligonucleotide was measured according to the method described in the above measurement method 1, and the yield of the oligonucleotide was measured according to the method described in the above measurement method 2.

Example 25

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.514 μmol parts of the resulting solution was collected in a falcon tube having a volume of 15 mL. Nitromethane 2.89 mg and 2,6-di-tert-butyl-p-cresol (BHT) 34.10 mg were added thereto (the amount of BHT was 5.8 mol per 1 mol of a protecting group), and was solubilized, and 1M tetra-n-butylammonium fluoride (TBAF) in dimethyl sulfoxide solution 0.82 g (which was dehydrated with molecular sieve 4 A) (the amount of TBAF was 29.1 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.4 mg, and the purity was 55%. As for the obtained crude product, the purity of the oligonucleotide was measured according to the method described in the above measurement method 1, and the yield of the oligonucleotide was measured according to the method described in the above measurement method 2.

Example 26

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.508 μmol parts of the resulting solution was collected in a falcon tube having a volume of 15 mL. Nitromethane 2.89 mg and 2,6-di-tert-butyl-p-cresol (BHT) 47.10 mg were added thereto (the amount of BHT was 8.1 mol per 1 mol of a protecting group), and was solubilized, and 1M tetra-n-butylammonium fluoride (TBAF) in dimethyl sulfoxide solution 0.76 g (which was dehydrated with molecular sieve 4 A) (the amount of TBAF was 27.3 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.3 mg, and the purity was 54%. As for the obtained crude product, the purity of the oligonucleotide was measured according to the method described in the above measurement method 1, and the yield of the oligonucleotide was measured according to the method described in the above measurement method 2.

Example 27

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.513 μmol parts of the resulting solution was collected in a falcon tube having a volume of 15 mL. Nitromethane 2.89 mg and 6-tert-butyl-2,4-xylenol 6.00 mg were added thereto (the amount of 6-tert-butyl-2,4-xylenol was 1.3 mol per 1 mol of a protecting group), and was solubilized, and 1M tetra-n-butylammonium fluoride (TBAF) in dimethyl sulfoxide solution 0.78 g (which was dehydrated with molecular sieve 4 A) (the amount of TBAF was 27.8 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.5 mg, and the purity was 54%. As for the obtained crude product, the purity of the oligonucleotide was measured according to the method described in the above measurement method 1, and the yield of the oligonucleotide was measured according to the method described in the above measurement method 2.

Example 28

Using CPG on which 93.86 µmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 µmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.520 µmol parts of the resulting solution was collected in a falcon tube having a volume of 15 mL. Nitromethane 2.89 mg and 4,6-di-tert-butyl-m-cresol 5.10 mg were added thereto (the amount of 4,6-di-tert-butyl-m-cresol was 0.9 mol per 1 mol of a protecting group), and was solubilized, and 1M tetra-n-butylammonium fluoride (TBAF) in dimethyl sulfoxide solution 0.78 g (which was dehydrated with molecular sieve 4 A) (the amount of TBAF was 27.3 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.3 mg, and the purity was 53%. As for the obtained crude product, the purity of the oligonucleotide was measured according to the method described in the above measurement method 1, and the yield of the oligonucleotide was measured according to the method described in the above measurement method 2.

Example 29

Using CPG on which 93.86 µmol of guanosine derivative was supported, and each amidite represented by formula (A8), formula (A9), formula (A10), formula (A11), or formula (A12) respectively, a solid-phase synthesis of sequence (I) was carried out by an AKTA oligopilot plus 100. Thereafter, the CPG support on which 30.02 µmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.504 µmol parts of the resulting solution was collected in a falcon tube having a volume of 15 mL. Nitromethane 2.89 mg and 2,2,6,6-tetramethyl-4-piperidyl methacrylate 0.70 mg were added thereto (the amount of 2,2,6,6-tetramethyl-4-piperidyl methacrylate was 0.1 mol per 1 mol of a protecting group), and was solubilized, and 1M tetra-n-butylammonium fluoride (TBAF) in dimethyl sulfoxide solution 0.78 g (which was dehydrated with molecular sieve 4 A) (the amount of TBAF was 28.2 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.2 mg, and the purity was 50%. As for the obtained crude product, the purity of the oligonucleotide was measured according to the method described in the above measurement method 1, and the yield of the oligonucleotide was measured according to the method described in the above measurement method 2.

Example 30

Using CPG on which 93.86 µmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 µmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.511 µmol parts of the resulting solution was collected in a falcon tube having a volume of 15 mL. Nitromethane 2.89 mg and 2,2,6,6-tetramethylpiperidine-1-oxyl free radical 4.50 mg were added thereto (the amount of 2,2,6,6-tetramethylpiperidine-1-oxyl free radical was 1.1 mol per 1 mol of a protecting group), and was solubilized, and 1M tetra-n-butylammonium fluoride (TBAF) in dimethyl sulfoxide solution 0.78 g (which was dehydrated with molecular sieve 4 A) (the amount of TBAF was 27.8 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.0 mg, and the purity was 52%. As for the obtained crude product, the purity of the oligonucleotide was measured according to the method described in the above measurement method 1, and the yield of the oligonucleotide was measured according to the method described in the above measurement method 2.

Example 31

Using CPG on which 93.86 µmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 µmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.503 µmol parts of the resulting solution was collected in a falcon tube having a volume of 15 mL. Nitromethane 2.89 mg and dioctadecylsulfide 14.00 mg were added thereto (the amount of dioctadecylsulfide was 1.0 mol per 1 mol of a protecting group), and was solubilized, and 1M tetra-n-butylammonium fluoride (TBAF) in dimethyl sulfoxide solution 0.81 g (which was dehydrated with molecular sieve 4 A) (the amount of TBAF was 29.4 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.0 mg, and the purity was 54%. As for the obtained crude product, the purity of the oligonucleotide was measured according to the method described in the above measurement method 1, and the yield of the oligonucleotide was measured according to the method described in the above measurement method 2.

Example 32

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.521 μmol parts of the resulting solution was collected in a falcon tube having a volume of 15 mL. Nitromethane 2.89 mg and benzophenone 4.80 mg were added thereto (the amount of benzophenone was 1.0 mol per 1 mol of a protecting group), and was solubilized, and 1M tetra-n-butylammonium fluoride (TBAF) in dimethyl sulfoxide solution 0.83 g (which was dehydrated with molecular sieve 4 A) (the amount of TBAF was 29.0 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.0 mg, and the purity was 53%. As for the obtained crude product, the purity of the oligonucleotide was measured according to the method described in the above measurement method 1, and the yield of the oligonucleotide was measured according to the method described in the above measurement method 2.

Example 33

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.491 μmol parts of the resulting solution was collected in a falcon tube having a volume of 15 mL. Nitromethane 2.89 mg and triphenylphosphine 6.40 mg were added thereto (the amount of triphenylphosphine was 1.0 mol per 1 mol of a protecting group), and was solubilized, and 1M tetra-n-butylammonium fluoride (TBAF) in dimethyl sulfoxide solution 0.79 g (which was dehydrated with molecular sieve 4 A) (the amount of TBAF was 29.4 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.0 mg, and the purity was 53%. As for the obtained crude product, the purity of the oligonucleotide was measured according to the method described in the above measurement method 1, and the yield of the oligonucleotide was measured according to the method described in the above measurement method 2.

Comparative Example 2

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.510 μmol parts of the resulting solution was collected in a falcon tube having a volume of 15 mL. Nitromethane 2.89 mg was added thereto, and 1M tetra-n-butylammonium fluoride (TBAF) in dimethyl sulfoxide solution 1.56 g (which was dehydrated with molecular sieve 4 A) (the amount of TBAF was 55.8 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.1 mg, and the purity was 49%. As for the obtained crude product, the purity of the oligonucleotide was measured according to the method described in the above measurement method 1, and the yield of the oligonucleotide was measured according to the method described in the above measurement method 2.

Reference Example 1

Using CPG on which 93.86 μmol of guanosine derivative was supported, and each amidite represented by formula (A8), formula (A9), formula (A10), formula (A11), or formula (A12) respectively, solid-phase synthesis of sequence (I) was carried out by an AKTA oligopilot plus 100. Thereafter, the CPG support on which 30.02 μmol of the oligonucleotide was supported was collected, and the oligonucleotide was released from the solid support using aqueous ammonia 10.18 g and ethanol 3.03 g, and the support was filtered off, and the filtrate containing the released oligonucleotide was concentrated to dryness. Next, the released oligonucleotide was solubilized in 13.24 g of dimethyl sulfoxide, and thereto were added acetonitrile 3.00 g, and 0.497 μmol parts of the resulting solution was collected in a falcon tube having a volume of 15 mL. Nitromethane 2.89 mg was added thereto, and 1M tetra-n-butylammonium fluoride (TBAF) in dimethyl sulfoxide solution 0.82 g (which was dehydrated with molecular sieve 4 A) (the amount of TBAF was 30.1 moles per 1 mole of a protecting group) was flown thereto, and the resulting mixture was stirred homogenously with a vortex mixer, and thereafter, the resulting mixture was kept its temperature at 30° C. for 4 hours to deprotect a 2'-EMM protecting group. Any protecting groups were deprotected. The crude product was obtained by a precipitation procedure. The yield was 4.2 mg, and the purity was 49%.

Further, the aqueous solution 4.7 mL wherein the entire amounts of the obtained crude products contained was purified by an affinity chromatography. Specifically, using an AKTA pure 150 (manufactured by Critiva Corporation), the entire amounts of aqueous solution of nucleic acid was applied to a commercially available affinity column (Skill-Pak Toyopearl AF-Chelate-650M, 1 mL, Tosoh Corporation), and water as a mobile phase, and a liquid 20 mL was flown in the flow rate 0.6 mL/min. The UV (260 nm) of the flown solution was confirmed by a monitor, and the entire amounts of the fraction parts where the elution of the nucleic acid was determined were collected, and the resulting mixtures were concentrated through a membrane filtration to obtain a nucleic acid purified material.

The measurement results are shown in Tables 2 to 4 below.

In the Tables below, the used amounts of the radical reaction inhibitors mean the used amounts for the numerical values calculated by multiplying 1 mol of the compound that is supported on the solid carrier by the number of the case where R represents a group represented by formula (1) in the formula (3).

TABLE 2

| | Protecting group at 2' position | Radical reaction inhibitor | Used amounts of radical reaction inhibitor | Relative yield per unit volume | Purity of nucleic acid by HPLC measurement |
|---|---|---|---|---|---|
| Ex. 1 | CEM | 2,6-di-tert-butyl-p-cresol | 0.1 equiv. | 1.06 | 52% |
| Ex. 2 | CEM | 2,6-di-tert-butyl-p-cresol | 0.5 equiv. | 1.02 | 53% |
| Ex. 3 | CEM | 2,6-di-tert-butyl-p-cresol | 1.0 equiv. | 1.02 | 53% |
| Ex. 4 | CEM | 2,6-di-tert-butyl-p-cresol | 2.1 equiv. | 1.00 | 53% |
| Ex. 5 | CEM | 2,6-di-tert-butyl-p-cresol | 3.0 equiv. | 1.00 | 52% |
| Ex. 6 | CEM | 2,6-di-tert-butyl-p-cresol | 4.0 equiv. | 1.00 | 52% |
| Ex. 7 | CEM | 4-sec-butyl-2,6-di-tert-butylphenol | 1.0 equiv. | 1.02 | 54% |
| Ex. 8 | CEM | 6-tert-butyl-2,4-xylenol | 0.9 equiv. | 1.03 | 56% |
| Ex. 9 | CEM | 4,6-di-tert-butyl-m-cresol | 0.9 equiv. | 1.10 | 52% |
| Ex. 10 | CEM | 1,4-dihydroxybenzene | 1.0 equiv. | 1.05 | 53% |
| Ex. 11 | CEM | Bis(2,2,6,6-tetramethyl-4-piperidyl) sebacate | 0.1 equiv. | 1.06 | 52% |
| Ex. 12 | CEM | Bis(2,2,6,6-tetramethyl-4-piperidyl) sebacate | 0.5 equiv. | 1.06 | 54% |

TABLE 3

| | Protecting group at 2' position | Radical reaction inhibitor | Used amounts of radical reaction inhibitor | Relative yield per unit volume | Purity of nucleic acid by HPLC measurement |
|---|---|---|---|---|---|
| Ex. 13 | CEM | 2,2,6,6-tetramethyl-4-pyperidyl methacrylate | 0.1 equiv. | 1.00 | 52% |
| Ex. 14 | CEM | 2,2,6,6-tetramethyl-4-pyperidyl methacrylate | 0.5 equiv. | 0.99 | 52% |
| Ex. 15 | CEM | 2,2,6,6-tetramethyl-4-pyperidyl methacrylate | 1.1 equiv. | 0.99 | 52% |
| Ex. 16 | CEM | 2,2,6,6-Tetramethylpiperidine 1-oxyl-free radical | 1.0 equiv. | 1.00 | 55% |
| Ex. 17 | CEM | Dioctadecylsulfide | 1.1 equiv. | 1.01 | 55% |
| Ex. 18 | CEM | Benzophenone | 1.1 equiv. | 1.04 | 55% |
| Ex. 19 | CEM | n-octanohydrazide | 1.0 equiv. | 1.05 | 54% |
| Ex. 20 | CEM | succinic dihydrazide | 1.0 equiv. | 1.00 | 52% |
| Ex. 21 | CEM | triphenylphosphine | 0.9 equiv. | 1.05 | 54% |
| Comp Ex. 1 | CEM | none | — | 1.00 | 48% |

TABLE 4

|  | Protecting group at 2' position | Radical reaction inhibitor | Used amounts of radical reaction inhibitor | Relative yield per unit volume | Purity of nucleic acid by HPLC measurement |
|---|---|---|---|---|---|
| Ex. 22 | EMM | 2,6-di-tert-butyl-p-cresol | 0.2 equiv. | 1.03 | 53% |
| Ex. 23 | EMM | 2,6-di-tert-butyl-p-cresol | 1.0 equiv. | 0.98 | 53% |
| Ex. 24 | EMM | 2,6-di-tert-butyl-p-cresol | 4.0 equiv. | 1.04 | 55% |
| Ex. 25 | EMM | 2,6-di-tert-butyl-p-cresol | 5.8 equiv. | 1.08 | 55% |
| Ex. 26 | EMM | 2,6-di-tert-butyl-p-cresol | 8.1 equiv. | 1.05 | 54% |
| Ex. 27 | EMM | 6-tert-butyl-2,4-xylenol | 1.3 equiv. | 1.10 | 54% |
| Ex. 28 | EMM | 4,6-di-tert-butyl-m-cresol | 0.9 equiv. | 1.05 | 53% |
| Ex. 29 | EMM | 2,2,6,6-tetramethyl-4-pyperidyl methacrylate | 0.1 equiv. | 1.03 | 50% |
| Ex. 30 | EMM | 2,2,6,6-Tetramethylpiperidine 1-oxyl-free radical | 1.1 equiv. | 0.98 | 52% |
| Ex. 31 | EMM | dioctadecylsulfide | 1.0 equiv. | 0.98 | 54% |
| Ex. 32 | EMM | benzophenone | 1.0 equiv. | 0.98 | 53% |
| Ex. 33 | EMM | triphenylphosphine | 1.0 equiv. | 0.99 | 53% |
| Comp Ex. 2 | EMM | none | — | 1.00 | 49% |

As shown in the above Table 2 to Table 4, it is confirmed that when the deprotection reaction of a protecting group of a hydroxy group of a ribose which is contained in an oligonucleotide as described in Description was carried out in the presence of a radical reaction inhibitor, compared to the case where the reaction was carried out in the absence of a radical reaction inhibitor, the deprotection reaction proceeded more effectively, and as a result, the deprotected oligonucleotide with a high purity can be obtained.

INDUSTRIAL APPLICABILITY

A nucleic acid oligomer can be produced efficiently by the present invention.

FREE TEXT OF SEQUENCE LISTING

Sequence Nos. 1 to 13 in Sequence Listing represent base sequences of oligonucleotides that are produced according to the production method of the present invention.

SEQUENCE LISTING

The invention claimed is:

1. A production method for a nucleic acid oligomer of formula (4):

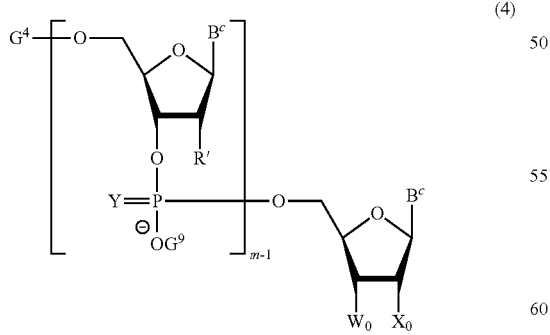

where

R' is identical to or different from each other and each independently represents a hydroxy group, a hydrogen atom, a fluorine atom, a methoxy group, a 2-methoxyethyl group, or an OQ' group, Q' is identical to or different from each other and each independently represents a methylene group which is bonded to the carbon atom at the 4' position of the ribose, an ethylene group which is bonded to the carbon atom at the 4' position of the ribose, or an ethylidene group which is bonded to the carbon atom at the 4' position of the ribose, the definitions of substituents $G^4$, $G^9$, Y, $B^c$ and m of the formula (4) are the same as those defined in the below formula (3), $W_0$ is a hydroxy group, $X_0$ is the same as those defined in the above R' group, when m is an integer of from 3 to 300, the nucleic acid oligomer of formula (4) may have a non-nucleotide linker replacing a number of nucleotides p, between the respective nucleotides at the 5' terminal and the 3' terminal, with the proviso that p is a positive integer satisfying m-1 >p, comprising:

contacting a nucleic acid oligomer of formula (3) with a fluoride ion in the presence of a radical reaction inhibitor:

(3)

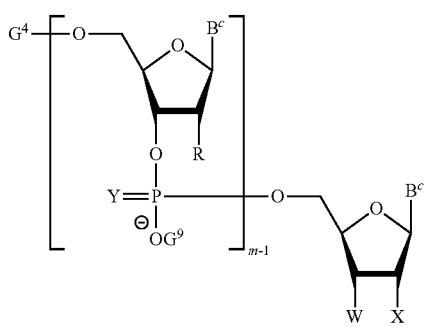

where
G⁴ represents a hydrogen atom or a protecting group of a hydroxy group,
G⁹ represents an ammonium ion, an alkylammonium ion, an alkali metal ion, a hydrogen ion or a hydroxyalkylammonium ion,
B$^c$ represents a nucleobase, each of which is independently identical to or different from each other,
R is identical to or different from each other and each independently represents a hydrogen atom, a fluorine atom or an OQ group,
Q is identical to or different from each other and each independently represents a tert-butyldimethylsilyl group, a methyl group, a 2-methoxyethyl group, a methylene group which is bonded to the carbon atom at the 4' position of the ribose, an ethylene group which is bonded to the carbon atom at the 4' position of the ribose, an ethylidene group which is bonded to the carbon atom at the 4' position of the ribose, or a protecting group of formula (1):

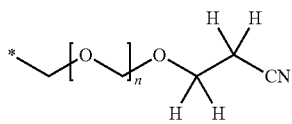

(1)

where
the bond marked with * represents a bond with the oxygen atom of the OQ group, and
n represents any integer of 0 or more, more),
Y is identical to or different from each other and each independently represents an oxygen atom or a sulfur atom,
m represents any integer from 2 to 300,
W and X are defined as either the following (a) or (b):
(a) when W is a hydroxy group, X is the same as defined as those of the above R group,
(b) when X is a hydroxy group, W represents an OV group,
V represents a tert-butyldimethylsilyl group or the group of the above formula (1),
with proviso that at least one group of the above R, W and X represents a hydroxy group protected with the protecting group of the above formula (1), and
when m is an integer of from 3 to 300, the nucleic acid oligomer of formula (3) may have a non-nucleotide linker replacing a number of nucleotides p between the respective nucleotides at the 5' terminal and the 3' terminal, with the proviso that p is a positive integer satisfying m-1 >p,
wherein the radical reaction inhibitor is an inhibitor of radical chain reaction initiation, a radical scavenger, or a peroxide decomposer,
the inhibitor of radical chain reaction initiation is a metal deactivator or an ultraviolet absorber,
the metal deactivator is n-octanohydrazide, succinic dihydrazide, 2-Hydroxy-N-1H-1,2,4-triazol-3-ylbenzamide, N'1,N'12-Bis (2-hydroxybenzoyl) dodecanedihydrazide, N,N'-Bis [3-(3,5-di-tert-butyl-4-hydroxyphenyl) propionyl] hydrazine, or 1,3,5-Triazine-2,4,6-triamine,
the ultraviolet absorber is benzophenone, 2-(2H-Benzotriazol-2-yl)-4,6-bis (1-methyl-1-phenylethyl) phenol, 2-(2H-Benzotriazol-2-yl)-4-(1,1,3,3-tetramethylbutyl) phenol, 2,2'-Methylenebis [6-(2H-benzotriazol-2-yl)-4-(1,1,3,3-tetramethylbutyl) phenol], 2-(2H-Benzotriazol-2-yl)-p-cresol, 2-(5-chloro-2H-benzotriazol-2-yl)-6-tert-butyl-4-methylphenol, 2-(4,6-Diphenyl-1,3,5-triazin-2-yl)-5-[2-(2-ethylhexanoyloxy) ethoxy] phenol, 2,4,6-tris (2-hydroxy-4-hexyloxy-3-methylphenyl)-1,3,5-triazine, or [2-hydroxy-4-(octyloxy) phenyl] (phenyl) methanone,
the radical scavenger is a compound of formula (8) or a compound of formula (12):

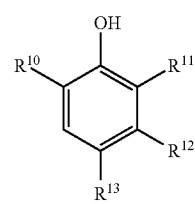

(8)

where R¹⁰, R¹¹, R¹², and R¹³ are each independently identical to or different from each other and represent a chain hydrocarbon group, a carbocyclyl group, a heterocyclyl group, an alkoxy group, an alkylsulfanyl group, SiR⁵¹R⁵²R⁵³, an amide group, C(O)R⁶¹, OC(O)R⁶¹, a hydroxy group, or a hydrogen atom, R⁵¹, R⁵², and R⁵³ are each independently identical to or different from each other and represent an alkyl group, an alkoxy group, or a hydrogen atom, wherein the chain hydrocarbon group, the carbocyclyl group, the heterocyclyl group, the alkoxy group, and the alkylsulfanyl group may optionally have one or more substituents, and R⁶¹ represents a chain hydrocarbon group,

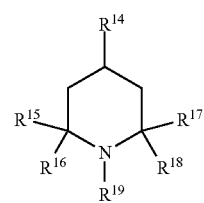

(12)

where R¹⁴ represents OC(O)R²⁰, NHR²⁰, or a hydrogen atom, R¹⁹ represents an alkyl group, an alkoxy group, an oxygen free radical, a hydroxy group, or a hydrogen atom, R¹⁵, R¹⁶, R¹⁷, and R¹⁸ are each independently identical to or different from each other and represent an alkyl group or a hydrogen atom, R²⁰ represents a chain hydrocarbon group, a carbocyclyl group, a heterocyclyl group, an alkoxy group, an alkylsulfanyl group, $SiR^{54}R^{55}R^{56}$, an amide group, a hydroxy group, or a hydrogen atom, wherein the chain hydrocarbon group, the carbocyclyl group, the heterocyclyl group, the alkoxy group, and the alkylsulfanyl group may optionally have one or more substituents, and $R^{54}$, $R^{55}$, and $R^{56}$ are each independently identical to or different from each other and represent an alkyl group, an alkoxy group, or a hydrogen atom, and the peroxide decomposer is triphenylphosphine, triphenylphosphite, 3,9-Bis (octadecyloxy)-2,4,8,10-tetraoxa-3,9-diphosphaspiro [5.5] undecane, 3,9-Bis (2,6-di-tert-butyl-4-methylphenoxy)-2,4,8,10-tetraoxa-3,9-diphosphaspiro [5.5] undecane, 2,2'-Methylenebis (4,6-di-tert-butylphenyl) 2-ethylhexyl phosphite, Tris (2,4-ditert-butylphenyl) phosphite, Tris (nonylphenyl) phosphite, Tetra-C12-15-alkyl (propane-2,2-diylbis (4,1-phenylene)) bis (phosphite), 2-Ethylhexyl diphenyl phosphite, Isodecyl diphenyl phosphite, Triisodecyl phosphite, Dioctadecylsulfide, 2,2-Bis {[3-(dodecylthio)-1-oxopropoxy]methyl} propane-1,3-diyl bis [3-(dodecylthio) propionate], or Di (tridecyl) 3,3'-thiodipropionate.

2. The production method according to claim 1 wherein n is 0 or 1.

3. The production method according to claim 1 wherein n is 0.

4. The production method according to claim 1 wherein n is 1.

5. The production method according to claim 1 wherein the non-nucleotide linker is a linker comprising an amino acid backbone.

6. The production method according to claim 5 wherein the linker comprising an amino acid backbone is a linker formula (A14-1), (A14-2) or (A14-3);

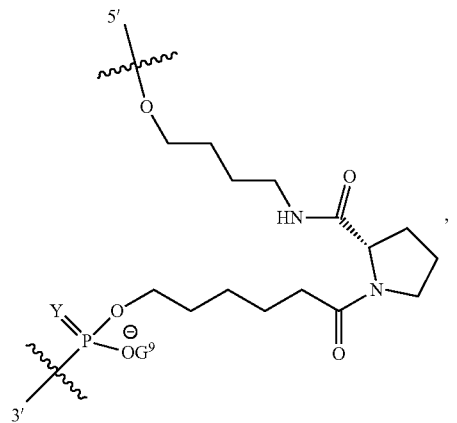

(A14-1)

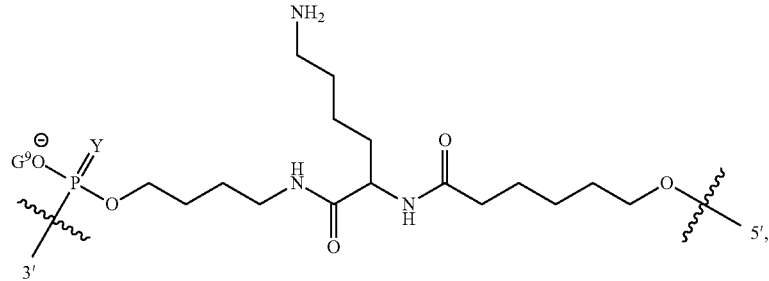

(A14-2)

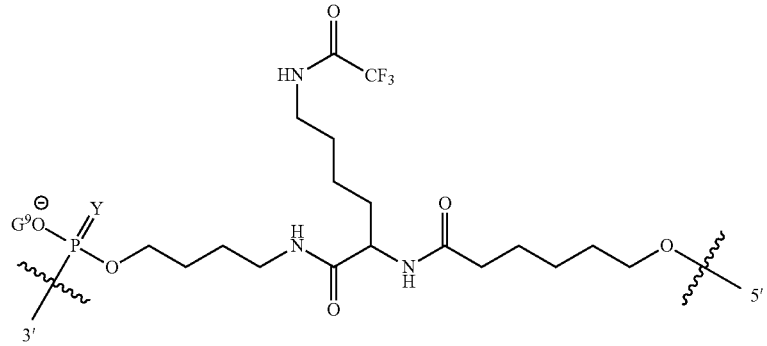

(A14-3)

where 5' and 3' represents the 5' terminal side and the 3' terminal side of the nucleic acid oligomer, respectively.

7. The production method according to claim 1 wherein W is a hydroxy group, X is an R group, $W_0$ is a hydroxy group, and $X_0$ is an R' group.

8. The production method according to claim 1 wherein the fluoride ion source is tetraalkylammonium fluoride.

9. The production method according to claim 1 wherein the fluoride ion source is tetra-n-butylammonium fluoride.

10. The production method according to claim 1 wherein the radical reaction inhibitor is the radical scavenger.

11. The production method according to claim 1 wherein the radical reaction inhibitor is the radical scavenger which is the compound of formula (8).

12. The production method according to claim 1 wherein the radical reaction inhibitor is the radical scavenger which is the compound of formula (12).

13. The production method according to claim 1 wherein the radical reaction inhibitor is the peroxide decomposer.

14. The production method according to claim 1 wherein the radical reaction inhibitor is the inhibitor of radical chain reaction initiation.

15. The production method according to claim 1 wherein a molar amount S of the radical reaction inhibitor used is 9 moles or less with respect to 1 mole of a mole number T, where the mole number T is calculated by multiplying a mole number U of the nucleic acid oligomer of formula (3) by the number V of the substituent R being a group of formula (1) in the formula (3), which is represented by formulas:

$$S/T \leq 9,$$

$$T = U \times V.$$

16. The production method according to claim 1 wherein for R, W and X in the nucleic acid oligomer of formula (3), the proportion of the protecting group of the formula (1) relative to the total number of R, W, and X is 10% or more, and the nucleic acid chain length is 10 mer to 300 mer.

\* \* \* \* \*